US012125249B2

United States Patent
Joshi et al.

(10) Patent No.: US 12,125,249 B2
(45) Date of Patent: Oct. 22, 2024

(54) OVERLAPPED PATCHES FOR MESH CODING FOR VIDEO BASED POINT CLOUD COMPRESSION

(71) Applicant: Samsung Electronics Co., Ltd., Suwon-si (KR)

(72) Inventors: Rajan Laxman Joshi, San Diego, CA (US); Esmaeil Faramarzi, Richardson, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 17/532,859

(22) Filed: Nov. 22, 2021

(65) Prior Publication Data

US 2022/0164994 A1    May 26, 2022

Related U.S. Application Data

(60) Provisional application No. 63/219,181, filed on Jul. 7, 2021, provisional application No. 63/117,719, filed on Nov. 24, 2020.

(51) Int. Cl.
*G06T 9/00* (2006.01)
*G06T 17/20* (2006.01)

(52) U.S. Cl.
CPC ............ *G06T 9/001* (2013.01); *G06T 17/205* (2013.01)

(58) Field of Classification Search
CPC ............................. G06T 9/001; G06T 17/205
See application file for complete search history.

(56) References Cited

U.S. PATENT DOCUMENTS

| 10,853,974 B2 | 12/2020 | Budagavi et al. |
| 11,210,852 B2 | 12/2021 | Min et al. |
| 2016/0330493 A1* | 11/2016 | Chuah ................ H04N 21/4781 |

(Continued)

FOREIGN PATENT DOCUMENTS

| KR | 10-20190053129 A | 5/2019 |
| KR | 10-20190053304 A | 5/2019 |

OTHER PUBLICATIONS

Wei et al., Novel and fast mapping triangulation algorithm for unorganized points cloud, Optical Engineering, vol. 47, No. 11, pp. 117205-1-117205-8 (Year: 2008).*

(Continued)

*Primary Examiner* — Ping Y Hsieh
*Assistant Examiner* — Xiao Liu

(57) ABSTRACT

An encoding device, a decoding device, and a method for mesh decoding are disclosed. The method for mesh decoding includes receiving a bitstream. The method also includes decoding a frame that includes pixels from the bitstream. A portion of the pixels of the frame represent geometric locations of vertices of a 3D mesh that are organized into overlapped patches. The method further includes decoding connectivity information from the bitstream. Additionally, the method includes identifying triangles associated with the overlapped patches. The triangles represented in an overlapped patch of the overlapped patches are allocated to a projection direction based on a normal vector associated with each of the triangles of the overlapped patch. The method also includes reconstructing the 3D mesh based on the connectivity information and the overlapped patches.

20 Claims, 20 Drawing Sheets

(56) References Cited

U.S. PATENT DOCUMENTS

2017/0301133 A1* 10/2017 Min ...................... G06T 17/205
2019/0057545 A1   2/2019 Varekamp et al.
2019/0139266 A1*  5/2019 Budagavi ................. G06T 9/00
2020/0286261 A1   9/2020 Faramarzi et al.
2021/0090301 A1*  3/2021 Mammou ................ G06T 7/11

OTHER PUBLICATIONS

International Search Report and Written Opinion of the International Searching Authority regarding International Patent Application No. PCT/KR2021/017427 dated Feb. 24, 2022, 11 pages.

Wei et al., "Novel and fast mapping triangulation algorithm for unorganized points cloud", Optical Engineering, vol. 47, No. 11, Nov. 2008, pp. 117205-1-117205-8.

Lee et al., "The Fast 3D mesh generation method for a large scale of point data", The Korean Society of Mechanical Engineers (KSME) Spring/Autumn Conference, Jan. 2000, pp. 705-711.

Convenor, ISO/IEC JTC 1/SC 29/WG 11, "ISO/IEC FDIS 23090-5 Visual Volumetric Video-based Coding and Video-based Point Cloud Compression", 352 pages.

* cited by examiner

OVERLAPPED PATCHES FOR MESH CODING FOR VIDEO BASED POINT CLOUD COMPRESSION

CROSS-REFERENCE TO RELATED APPLICATION AND CLAIM OF PRIORITY

This application claims priority under 35 U.S.C. § 119(e) to U.S. Provisional Patent Application No. 63/117,719 filed on Nov. 24, 2020 and U.S. Provisional Patent Application No. 63/219,181 filed on Jul. 7, 2021. The above-identified provisional patent applications are hereby incorporated by reference in their entirety.

TECHNICAL FIELD

This disclosure relates generally to multimedia data. More specifically, this disclosure relates to overlapped patches for mesh coding for video based point cloud compression.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds or meshes, can be used in the immersive environment.

Advances in 3D technologies have spurred a new wave of innovation in the creation, transmission, and rendering of Virtual Reality (VR) Augmented Reality (AR), and Mixed Reality (MR). Point clouds and meshes are common in a variety of applications such as gaming, 3D maps, visualizations, medical applications, augmented reality, virtual reality, autonomous driving, multi-view replay, six degrees of freedom (6DoF) immersive media, to name a few. Point clouds and meshes, if uncompressed, generally require a large amount of bandwidth for transmission. Due to the large bitrate requirement, point clouds are often compressed prior to transmission. Compressing a 3D object such as a point cloud or a mesh often requires specialized hardware. To avoid specialized hardware to compress a 3D point cloud, a 3D point cloud can be manipulated onto traditional two-dimensional (2D) video frames that can be compressed and reconstructed on a different device in order to be viewed by a user.

SUMMARY

This disclosure describes overlapped patches for mesh coding for video based point cloud compression.

In one embodiment a decoding device for mesh decoding is provided. The decoding device includes a communication interface and a processor. The communication interface is configured to receive a bitstream. The processor is configured to decode a frame that includes pixels from the bitstream. A portion of the pixels of the frame represent geometric locations of vertices of a three dimensional (3D) mesh that are organized into overlapped patches. The processor is also configured to decode connectivity information from the bitstream. The processor is further configured to identify triangles associated with the overlapped patches. The triangles represented in an overlapped patch of the overlapped patches are allocated to a projection direction based on a normal vector associated with each of the triangles of the overlapped patch. Additionally, the processor is configured to reconstruct the 3D mesh based on the connectivity information and the overlapped patches.

In another embodiment an encoding device for mesh encoding is provided. The encoding device includes a processor and a communication interface. The processor is configured to identify, for a 3D mesh composed of triangles, normal vectors associated with the triangles of the 3D mesh, respectively, wherein the triangles are associated with vertices and connectivity information. The processor is also configured to generate overlapped patches representing one or more of the triangles corresponding to portions of the 3D mesh, wherein the normal vectors of the triangles in an overlapped patch are closest to a projection direction of the overlapped patch. The processor is further configured to generate frames that include pixels representing the overlapped patches. Additionally, the processor is configured to encode the frames and the connectivity information to generate a bitstream. The communication is configured to transmit the bitstream.

In yet another embodiment a method for mesh decoding is provided. The method for mesh decoding includes receiving a bitstream. The method also includes decoding a frame that includes pixels from the bitstream. A portion of the pixels of the frame represent geometric locations of vertices of a 3D mesh that are organized into overlapped patches The method further includes decoding connectivity information from the bitstream. Additionally, the method includes identifying triangles associated with the overlapped patches The triangles represented in an overlapped patch of the overlapped patches are allocated to a projection direction based on a normal vector associated with each of the triangles of the overlapped patch. The method also includes reconstructing the 3D mesh based on the connectivity information and the overlapped patches.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
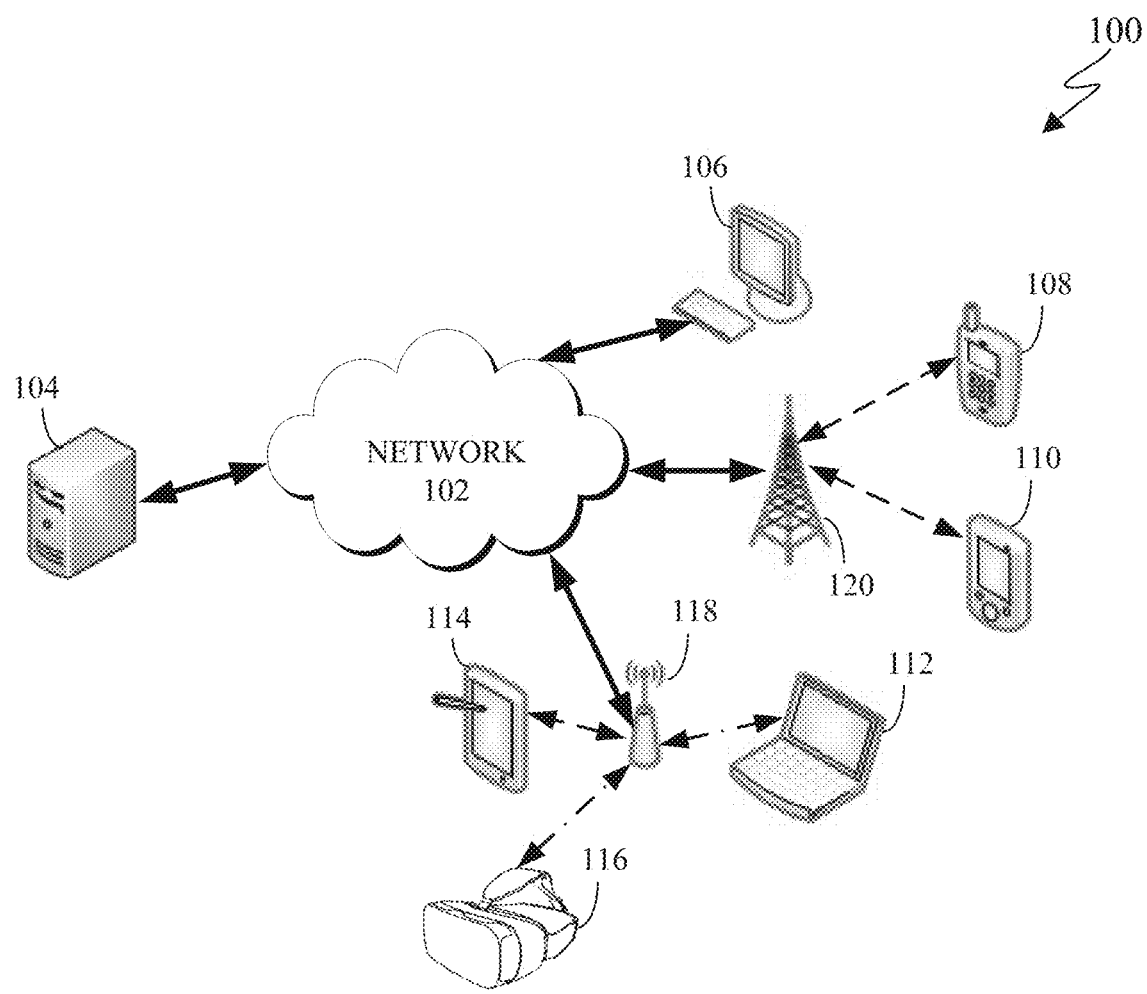
FIG. 1 illustrates an example communication system in accordance with an embodiment of this disclosure.

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: (i) "Text of ISO/IEC FDIS 23090-5 Visual Volumetric Video-based Coding and Video-based Point Cloud Compression," ISO/IEC JTC1/SC29/WG11 document N19579, September 2020 and (ii) U.S. patent application Ser. No. 16/810,682, filed Mar. 5, 2020.

Visual volumetric video based coding (V3C) is a mechanism for encoding and decoding visual volumetric data. V3C converts media from a 3D representation to multiple 2D representations. Video based point cloud compression (V-PCC) is based on V3C, but includes additional processes such as post decoding, pre-reconstruction, post-reconstruction, and adaptation.

Virtual reality (VR) is a rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to detected head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned at a particular geometric location within 3D space. In addition to a point having a geometric location, the points can include zero or more attributes (such as color, texture, reflectance, intensity, normal, material properties, motion, and the like). Similarly, a mesh is a virtual representation of an object in three dimensions. For example, a mesh is a collection of vertices (which are similar to the points of a point cloud) and edges which form faces by connecting to certain vertices. For example, a triangular mesh is similar to a point clod as it includes both positional information and attributes at vertices, but also includes connectivity information that connects two vertices. As used herein, the terms point cloud, 3D point cloud, 3D mesh, and mesh are used interchangeably. Similarly, the terms point (which is associated with a point cloud) and vertex (which is associated with a mesh) are used interchangeably.

A point cloud and mesh can be similar to a virtual object in a VR, AR, and MR environment. A point cloud or a mesh can be an object, multiple objects, a virtual scene (which includes multiple objects), and the like. As described above, point clouds and meshes are commonly used in a variety of applications, including gaming, 3D mapping, visualization, medicine, AR, VR, autonomous driving, multi-view replay, six DoF immersive media, to name a few.

Point clouds and meshes represent volumetric visual data. Point clouds and meshes consist of multiple points (referred to as vertices of a mesh) that are positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object. Similarly, a mesh includes multiple vertices which are similar to the points of a point cloud. FIG. 4E, described in greater detail below illustrates example vertices.

In addition to the geometric position of a point/vertex (the location of the point in 3D space), each point in the point cloud (or vertex in a mesh) can also include zero or more attributes such as color, texture, reflectance, intensity, surface normal, and the like. For example, a single point of a 3D point cloud can have no attributes. For another example, a single point of a 3D point cloud can have one or more attributes. In some applications, point clouds can also be used to approximate light field data in which, each point includes multiple view-dependent, color information (R, G, B or Y, U, V triplets).

A single point cloud can include billions of points, with each point associated with a geometric position and zero or more attributes. Similarly, a single mesh can include billions of vertices, with each vertex associated with a geometric position and zero or more attributes and connected to one or more additional vertices via connectivity information (also referred to as edges). A geometric position and each additional attribute that is associated with a point/vertex occupy a certain number of bits. For example, a geometric position of a single point in a point cloud (or vertex in a mesh) can consume thirty bits. For instance, if each geometric position of a single point/vertex is defined with an X value, a Y value, and a Z value, then each coordinate (the X, the Y, and the Z) uses ten bits, totaling the thirty bits. Similarly, an attribute that specifies the color of a single point (or vertex in a mesh) can consume twenty-four bits. For instance, if a color component of a single point is defined based on a Red value, a Green value, and a Blue value, then each color component (Red, Green, and Blue) uses eight bits, totaling the twenty-four bits. As a result, a single point (or vertex) with a ten-bit geometric data, per coordinate, and an eight-bit color attribute data, per color value, occupies fifty-four bits. Each additional attribute increases the bits required for a single point. If a frame represents one million points (and each point includes geometric data and color attribute data), the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to render and display the point cloud. Therefore, transmitting an uncompressed point cloud from one electronic device to another uses significant bandwidth due to the size and complexity of the data associated with a single point cloud. As a result, the point cloud is compressed prior to the transmission. Additionally, a mesh also includes connectivity information describing how the vertices are connected. The connectivity information uses significant bandwidth.

Embodiments of the present disclosure take into consideration that compressing a point cloud or a mesh is necessary to reduce the volume of data (bandwidth) that is used when a point cloud is transmitted from one device (such as a source device) to another device (such as a display device or user device). Certain dedicated hardware components can be used to meet the real-time demands or reduce delays or lags in the transmitting and rendering a 3D point cloud and mesh; however, such hardware components are often expensive. Additionally, many video codecs are not able to encode and decode 3D video content, such as a point cloud or mesh. Compressing and decompressing a 3D point cloud by leveraging existing 2D video codecs enables the encoding and decoding of a point cloud to be widely available without the need for new or specialized hardware. According to embodiments of the present disclosure, when the point cloud is converted from a 3D representation to a 2D representation, existing video codecs can be used to compress and reconstruct a point cloud.

Embodiments of the present disclosure provide systems and methods for converting an 3D mesh into a 2D representation that can be transmitted and then reconstructed into the 3D mesh for rendering. An encoder converts an input 3D mesh onto multiple 2D frames (such as geometry frames, attribute frames, and occupancy map frames). The 2D frames include patches that represent portions of the 3D mesh. In certain embodiments, a patches can include vertices that are also located in another patch. The 2D frames can represent video frames. The 2D video frames can be encoded (using video codecs such as HEVC, AVC, VP9, VP8, VVC, and the like) to compress the 2D frames for transmission via a bitstream. the encoder can also encode the connectivity information that specifies how the polygons of the mesh are formed. A decoder receives and decodes the bitstream and then reconstructs the 3D mesh from the 2D frames such that the 3D mesh can be rendered, displayed, and then viewed by a user.

To convert an 3D mesh to a 2D representation that can be transmitted using 2D video frames, the mesh is deconstructed from a 3D state into connectivity information and multiple patches (representing vertices of the mesh). The patches are packed into the 2D video frames. The vertices of the 3D mesh that are represented in one patch in a first frame correspond to the same vertices that are represented in another patch in a second frame when the two patches are positioned at the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

Embodiments of the present disclosure provide systems and methods for improving the compression and decompression of a mesh. To improve the compression and decompression of a mesh, embodiments of the present disclosure convert a mesh into a 2D representation that can be transmitted and then reconstructed into the mesh for rendering. To deconstruct a 3D point cloud for transmission from one device to another, the connectivity information is separated from vertices. Additionally, geometric positions of the vertices can be separated from the attribute information of the vertices. Projections of the mesh are made with respect to different projection planes, such that the 3D mesh is separated into multiple clusters of points which are represented as patches on 2D video frames. A first set of frames can include values representing geometry positions of the vertices. Each additional set of frames can represent different attributes of the mesh. For example, one attribute frame can include values representing color information associated with each of the points. The patches representing the geometry and attribute information (if present) are packed into geometry video frames and attribute video frames, respectively, where each pixel within any of the patches corresponds to a vertex in 3D space. The geometry video frames are used to encode the geometry information, and each of the corresponding attribute video frames (if present) are used to encode a corresponding attribute (such as color) of the 3D mesh.

When the point cloud or mesh is deconstructed to fit on multiple 2D video frames and compressed, by an encoder, the frames can be transmitted using less bandwidth than used to transmit the original point cloud. FIGS. 4B-4D, which are described in greater detail below, illustrate various stages of projecting a point cloud or mesh onto different plans and thereafter storing the projections into 2D frames. For example, FIG. 4A, which illustrates two views of a 3D point cloud or mesh, illustrates a 360° view of a point cloud or mesh. FIG. 4B illustrates the process of projecting a 3D point cloud onto different planes. It is noted that a similar process is applied to the vertices of a mesh. After the point cloud or mesh is projected onto different planes, FIG. 4C illustrates a geometry frame and FIG. 4D illustrates an attribute frame (which represents the color of the points of the 3D point cloud), which include patches corresponding to the various projections The geometry video frames are used to encode the geometry coordinates of the vertices of a 3D mesh (or points of the 3D point cloud). A location (u, v) of a pixel in the geometry frame corresponds to a (X, Y, Z) location of a vertex in 3D space. For example, the two transverse coordinates (with respect to the projection plane) of a 3D vertex corresponds to the column and row indices in the geometry video frame (u, v) plus a transverse-offset which determines the location of the entire patch within the video frame. The depth of the 3D vertex is encoded as the value of the pixel in the video frame plus a depth-offset for the patch. The depth of the vertex depends on whether the projection of the 3D point cloud is taken from the XY, YZ, or XZ coordinates.

The encoder can also generate an occupancy map (also referred to an occupancy map frame). The occupancy map shows the location of projected points in the 2D videos frames. For each pixel on the canvas, the occupancy map specifies whether that pixel is occupied, that is, whether it is part of a patch. The occupancy map shows the location of projected points in the 2D videos frames. For example, since the patches may not occupy the entirety of the generated frames, the occupancy map indicates which pixels of the geometry frame and attribute frame correspond to a point of the point cloud and which pixels are empty/invalid and do not correspond to a point of the point cloud (such as a pixel that represents padding). In certain embodiments, the occupancy map frame is compressed.

The encoder can also generate patch information. The patch information includes information about the patches in the frames (such as the geometry video frames, the attribute video frames, the occupancy map frames, and the like). The patch information can include the positioning of the patches within the 2D frame, the offsets for the patch segment in the 3D point cloud space, the plane on which the patch is projected on, and the like. The patch information can include information about the position and size of patches and their orientation in patch information, the position and size of the patches in the 3D space as well as certain other properties of the patches.

In certain embodiments, the patch information includes 3D information and 2D information. Regarding the 3D information, the patch information can specify the 3D locations of a patch, such as the location of a patch in 3D space. The patch information can also specify the 3D offset of a patch. Regarding the 2D information, the patch information can specify where the patches are located on a grid of a 2D frame, as well as the size of the patch. The patch information can also specify additional information related to the patches such as information about the type of patch.

The encoder that generated and compressed the frames can also encode the connectivity information to generate a second bitstream. In certain embodiments, another encoder encodes the connectivity information.

The compressed geometry frames, the compressed color frames (and any other attribute frame), the occupancy map frame, the connectivity information, and the patch information can be multiplexed to generate one or more bitstream. The encoder or another device then transmits the bitstream(s) to a different device. It is noted that the terms "bitstream," "sub-bitstream," and "substream" may be used interchangeably in the disclosure.

A decoder receives the bitstream, decompresses the bitstream into the frames, and reconstructs the vertices based on the information within the frames and applies the connectivity information to reconstruct the mesh. Thereafter the reconstructed 3D point can be rendered and displayed for a user to observe.

Embodiments of the present disclosure describe coding and decoding of 3D polygon meshes based on a point cloud compression. In certain embodiments, a 3D polygon mesh is encoded using a video-based point cloud compression such as V-PCC. The embodiments described below are directed towards triangular meshes, however the embodiments can be extended to other polygon meshes as well.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds or meshes. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a mesh, compress the mesh, transmit the mesh, receive the mesh, render the mesh, or a combination thereof. For example, the server 104 receives a mesh, separates vertices from the connectivity information, decomposes the vertices to fit on 2D frames, compresses the frames and the connectivity information to generate a bitstream. The bitstream can be transmitted to a storage device, such as an information repository, or one or more of the client devices 106-116. For another example, one of the client devices 106-116 can receives a mesh, separates vertices from the connectivity information, decomposes the vertices to fit on 2D frames, compresses the frames and the connectivity information to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
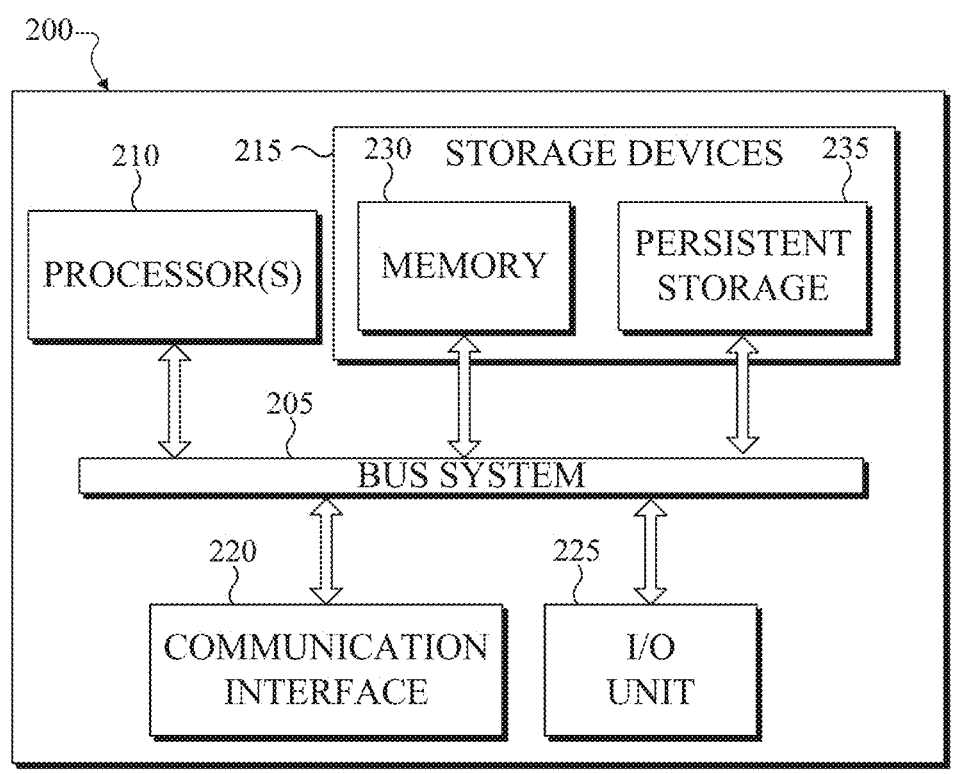
FIGS. 2 and 3 illustrate example electronic devices in accordance with an embodiment of this disclosure.
Figure 3:
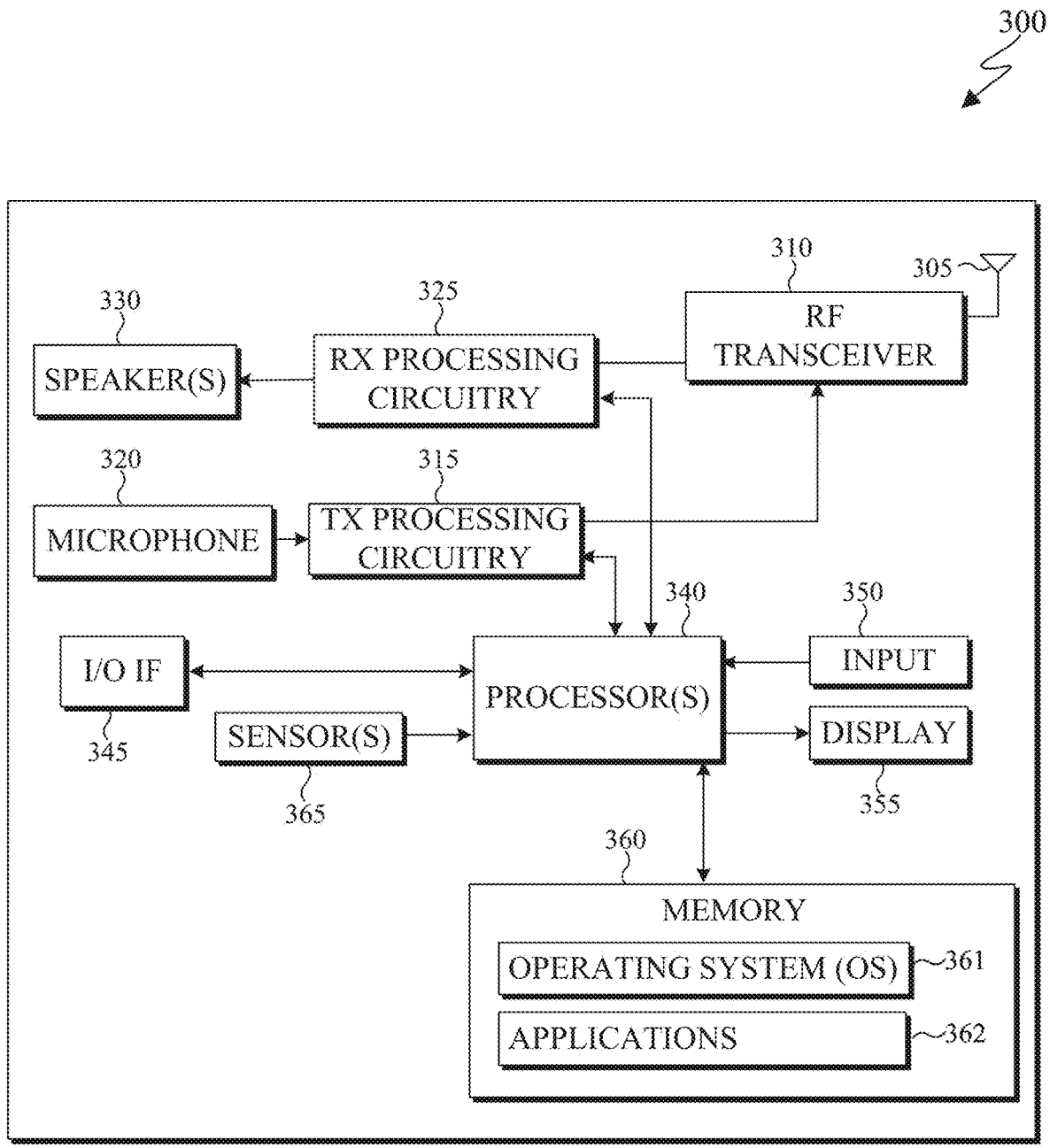

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the server 200 can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud (or mesh) stored within the storage devices 215. In certain embodiments, when the 3D point cloud (or mesh) is encoded by an encoder, the encoder also decodes the encoded 3D point cloud (or mesh) to ensure that when the point cloud (or mesh) is reconstructed, the reconstructed 3D point cloud (or mesh) matches the 3D point cloud (or mesh) prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for separating the vertices and the connectivity information, decomposing a point cloud (or mesh) into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud (or mesh) to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, trackball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud, a mesh, or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud or a mesh, the electronic device 300 or the server 200 of FIG. 2 can separate the vertices from the connectivity information. When the vertices and the connectivity information are separated, the vertices are similar to points of a point cloud. The electronic device 300 or the server 200300 can also segment the vertices to certain projection planes to create multiple patches. For example, a cluster of points of the point cloud or vertices of a mesh can be grouped together and represented as a patch on the 2D frames. A patch can represent a single aspect of the mesh, such as geometry (a geometric position of a vertex), or an attribute such as color, reflectance, and the like) that are associated with a vertex. Patches that represent the same attribute can be packed into the same 2D frame. The 2D frames are then encoded to generate a bitstream. Similarly, the connectivity information is also encoded to generate another bitstream. The two bitstreams can be multiplexed together and transmitted to another device as a single bitstream. During the encoding process additional content such as metadata, flags, parameter sets, syntax elements, occupancy maps, geometry smoothing parameters, one or more attribute smoothing parameters, and the like can be included in any of the bitstreams.

Similarly, when decoding media content included in a bitstream that represents a mesh or 3D point cloud, the electronic device 300 separates the received bitstream into encoded connectivity information and encoded vertex information. The bitstreams can include an occupancy map, 2D frames, auxiliary information (such as one or more flags, one or more syntax elements, or quantization parameter size), and the like. A geometry frame can include pixels that indicate geographic coordinates of vertices of a mesh (or points of the point cloud) in 3D space. Similarly, an attribute frame can include pixels that indicate the RGB (or YUV) color (or any other attribute) of each geometric vertex/point in 3D space. The auxiliary information can include one or more flags, one or more syntax elements, or quantization parameter size, one or more thresholds, geometry smoothing parameters, one or more attribute smoothing parameters, or any combination thereof. After reconstructing the 3D point cloud, the connectivity information (if available) is applied to the points (vertices) and then the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
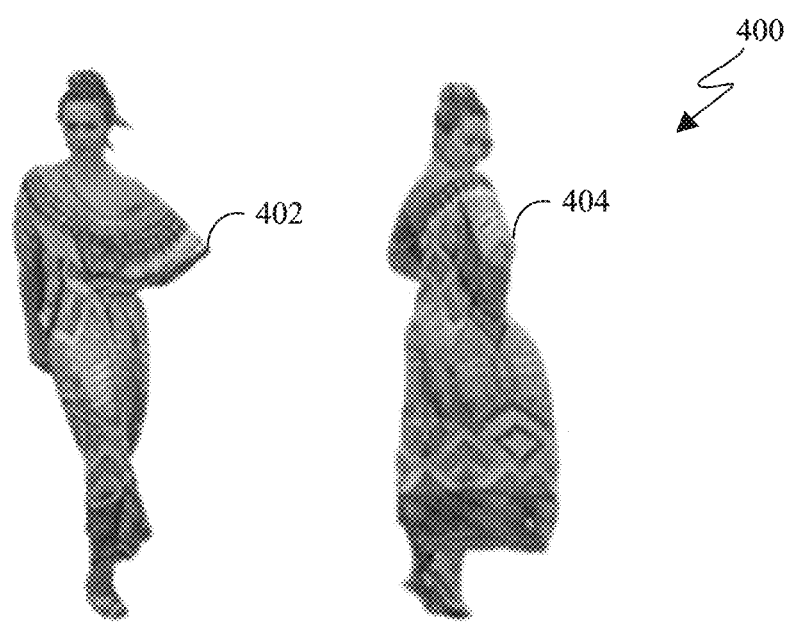
FIGS. 4A, 4B, 4C, and 4D illustrate various stages in generating frames that represent a 3D object in accordance with an embodiment of this disclosure.
Figure 4B:
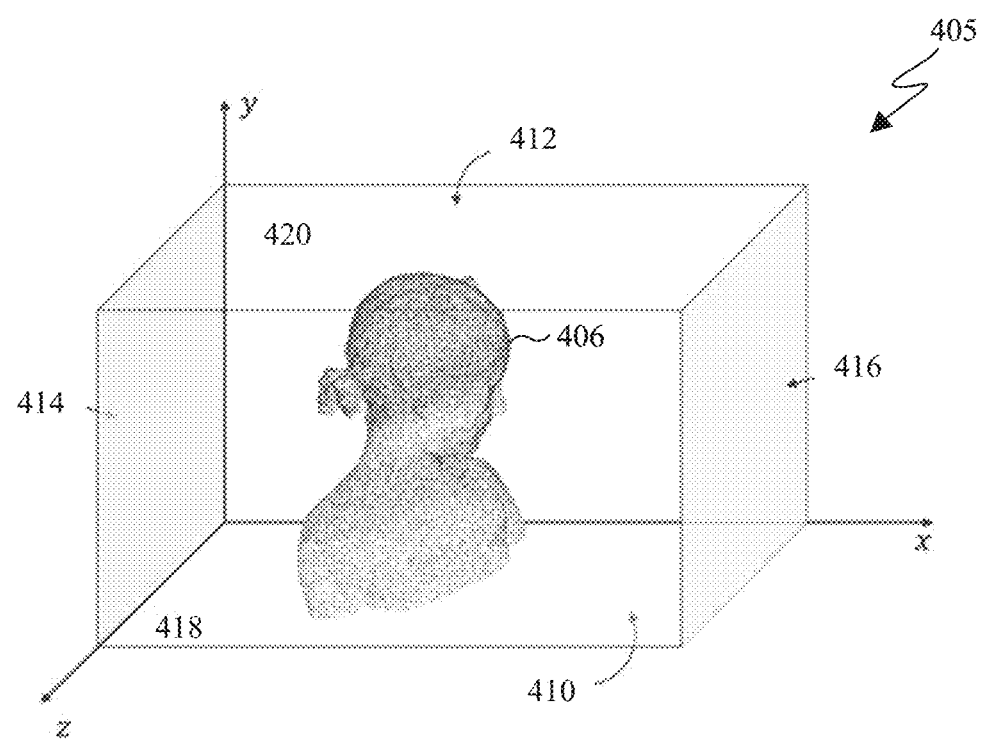
Figure 4C:
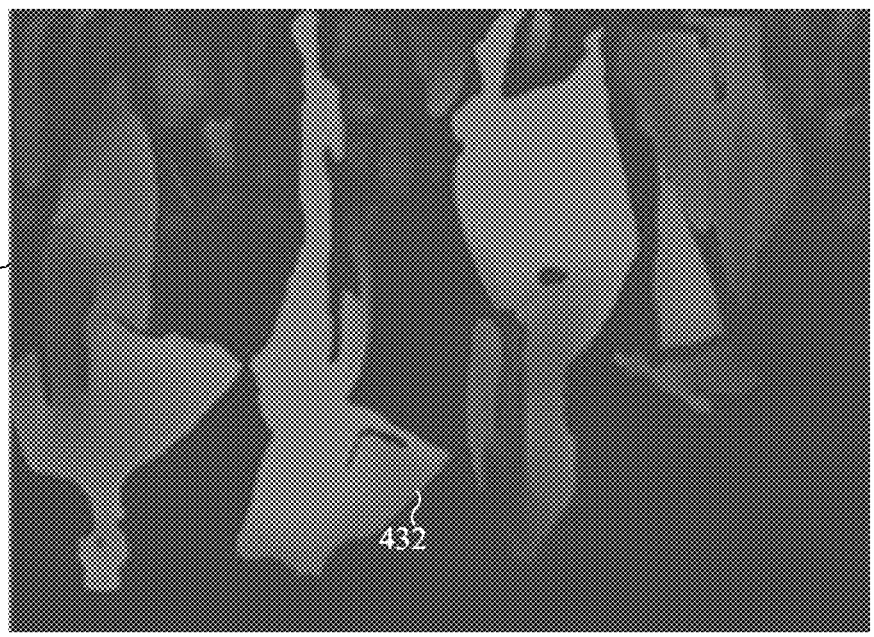
Figure 4D:
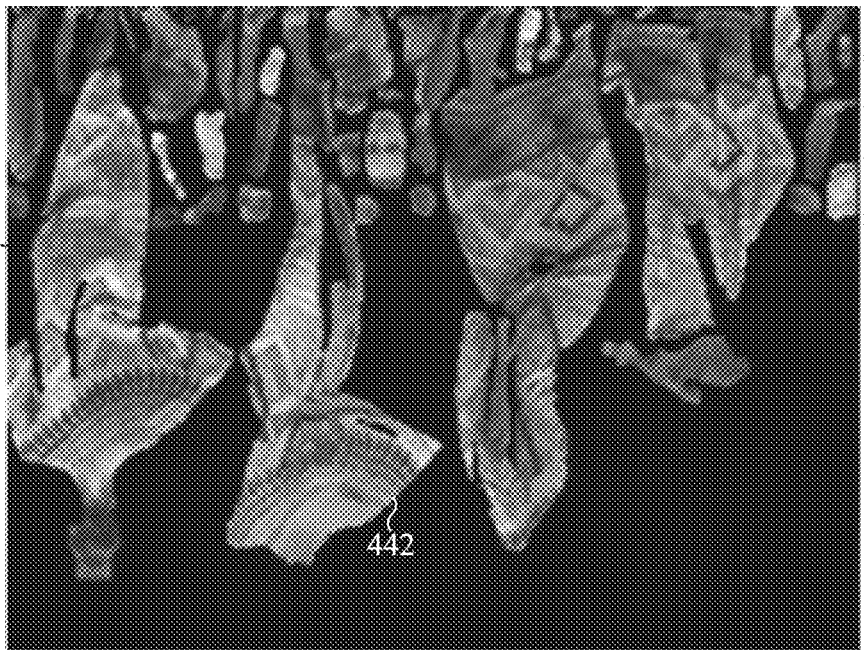

FIGS. 4A, 4B, 4C, and 4D illustrate various stages in generating frames that represent a 3D point cloud. In particular, FIG. 4A illustrate an example 3D object 400, FIG. 4B illustrates a diagram 405 of a point cloud that is surrounded by multiple projection planes, and FIGS. 4C and 4D illustrate 2D frames that include patches representing the 3D object 400 of FIG. 4A. For example, the FIG. 4C illustrates a 2D frame 430 that represents the geometric position of points/vertices of the 3D object 400, while the FIG. 4D illustrates the frame 440 that represents the color associated with points/vertices of the 3D object 400.

As discussed above, the data corresponding to a mesh and a point cloud are often too large to transmit to another device without first compressing the data. During compression of a mesh, the vertex coordinates and attribute(s) are separated from the connectivity information, such as the edges. When the edges of a mesh are separated from the vertices, the vertices can be encoded in a similar manner as a point cloud. As such, to compress the mesh the connectivity information is separated from the vertices yielding the point cloud and the connectivity information. The vertices (also referred to as points of a point cloud) can be projected onto multiple projection planes to create patches.

The 3D object 400 of FIG. 4A is a set of data points in 3D space that together represent a 3D point cloud or a mesh. Each point/vertex of the 3D object 400 includes a geometric position that provides the structure of the 3D point cloud and one or more attributes that provide information about each point such as color, reflectiveness, material, and the like. The 3D object 400 represents the entire 360° object. That is, the point cloud can be viewed from various angles such as the front 402, the sides, and the back 404, the top, the bottom.

The diagram 405 of FIG. 4B includes a 3D object 406 and multiple projection planes. The 3D object 406 can be similar to the 3D object 400 of FIG. 4A. That is, the 3D object 406 is a 3D point cloud or mesh. The 3D object 406 represents an entire 360° object. The 3D object 406 is surrounded by multiple projection planes, such as the projection plane 410, 412, 414, 416, 418, and 420. The projection plane 410 is separated from the projection plane 412 by a predefined distance. For example, the projection plane 410 corresponds to the projection plane XZ0 and the projection plane 412 corresponds to the projection plane XZ1. Similarly, the projection plane 414 is separated from the projection plane 416 by a predefined distance. For example, the projection plane 414 corresponds to the projection plane YZ0 and the projection plane 416 corresponds to the projection plane YZ1. Additionally, the projection plane 418 is separated from the projection plane 420 by a predefined distance. For example, the projection plane 418 corresponds to the projection plane XY0 and the projection plane 420 corresponds to the projection plane XY1. It is noted that additional projection planes can be included and the shape that the projection planes form can differ.

During the segmentation process, each of the points/vertices of the 3D object 406 are assigned to a particular projection plane, (such as the projection planes 410, 412, 414, 416, 418, and 420). The points that are near each other and are assigned to the same projection plane are grouped together to form a cluster which is represented as a patch such as any of the patches as illustrated in FIGS. 4C and 4D. More or less projection planes can be used when assigning points to a particular projection plane. Moreover, the projection planes can be at various locations and angles. For example, certain projection planes can be at a 45 degree incline with respect to the other projection planes, Similarly, certain projection planes can be at a 90 degree angle with respect to other projection planes.

FIGS. 4C and 4D illustrate the 2D frames 430 and 440, respectively. The frame 430 is a geometry frame as it illustrates the geometric location of each point/vertex of the 3D object 400 of FIG. 4A. The frame 430 includes multiple patches (such as a patch 432) representing the depth values of the 3D object 400. The value of each pixel in the frame 430 is represented as a lighter or darker color and corresponds to a distance each pixel is from a particular projection plane (such as one of the projection planes 410, 412, 414, 416, 418, and 420 of FIG. 4B).

The frame 440 is a color frame (one type of attribute) as it provides the color of each point of the 3D object 400 of FIG. 4A. The frame 440 includes multiple patches (such as a patch 442) representing values corresponding to the color of a point in the 3D object 400.

Each of the patches in FIGS. 4C and 4D can be identified by an index number. Similarly, each pixel within a patch can be identified by its location within the frame as well as the index number of the patch to which the pixel is within. The patch index number can be stored in an atlas frame.

In certain embodiments, certain patches within the frames 430 and 440 of FIGS. 4C and 4D, respectively, are overlapped patches, such as the patches illustrated in FIG. 6B and described in greater detail below.

A correspondence (or mapping) exists between the frame 430 and the frame 440. That is, each pixel in the frame 430 corresponds to a pixel at the same location in the frame 440. Each pixel of color in the frame 440 corresponds to a particular geometry pixel in the frame 430. For example, a mapping is generated between each pixel in the frame 430 and the frame 440. For example, each pixel within the patch 432 corresponds to a point/vertex in 3D space, and each pixel within the patch 442 provides a color to a point of the 3D point cloud (or vertex of a mesh) that is represented at the same location in the patch 432. As shown in the frames 430 and 440, some of the pixels correspond to valid pixels that represent the 3D object 400 while other pixels (the black area in the background) correspond to invalid pixels that do not represent the 3D object 400. In certain embodiments, the black area in the background could be filled with values for padding purposes. In certain embodiments, geometry frames (such as the frame 430), attribute frames (such as the frame 440), and occupancy map frames can be down sampled, so the correspondence does not match up exactly.

The frames 430 and 440 can be encoded with a video codec such as HEVC, AVC, VP9, VP8, VVC, AV1, and the like. A decoder receives a bitstream that includes the frames 430 and 440 and reconstructs the geometry of the 3D object from the frame 430 and colors the geometry of the object based on the frame 440 in order to generate a reconstructed point cloud or mesh. To generate the mesh, the decoder also decodes connectivity information and applies the connectivity information to the points/vertices that are located in 3D space.

Figure 4G:
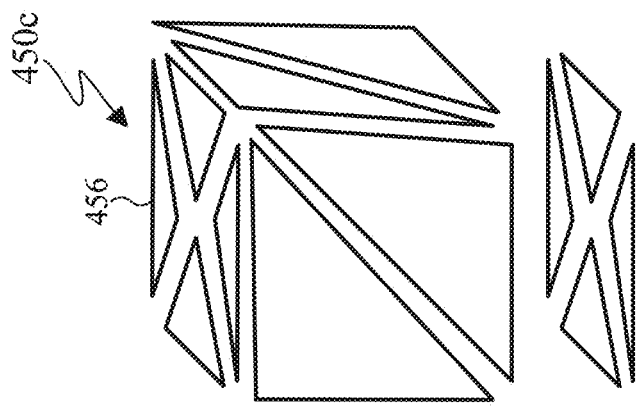
FIGS. 4E, 4F, and 4G illustrate the relationship between the components of a mesh in accordance with an embodiment of this disclosure.
Figure 4F:
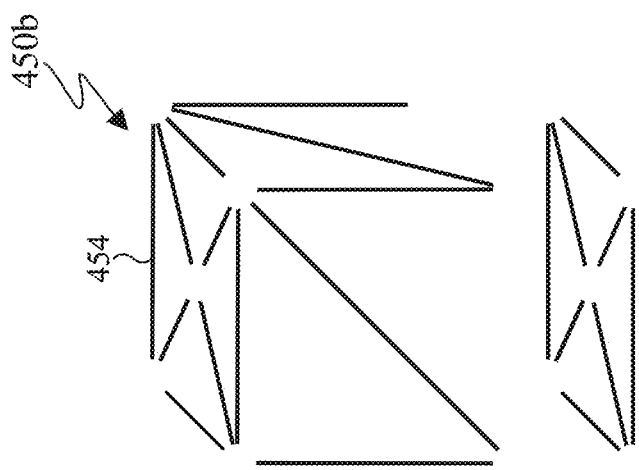
Figure 4E:
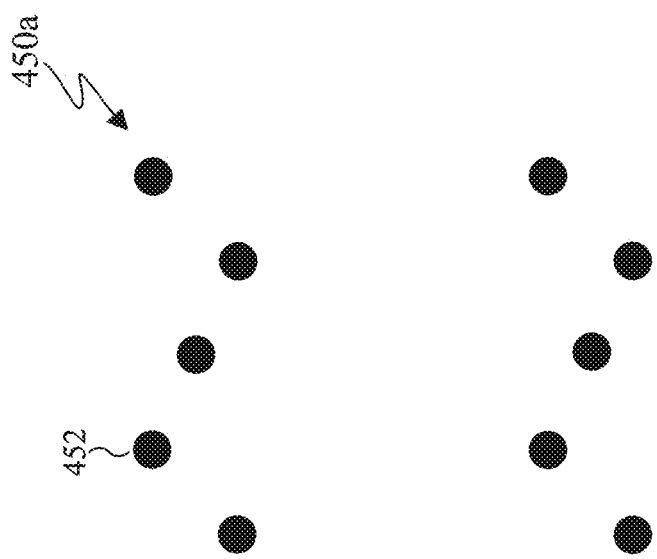

FIGS. 4E, 4F, and 4G illustrate the relationship between the components of a mesh in accordance with an embodiment of this disclosure. For example, FIG. 4E illustrates the vertices 450a. A vertex, such as the vertex 452, is a geometric coordinate in 3D space. Each vertex is similar to a point of a 3D point cloud. Even though the vertices 450a are illustrated on a two dimensional image and therefore the position of a vertex can be expressed in two coordinates (such as X and Y), it is noted that vertices of a 3D mesh are located with respect to three coordinates (such as X, Y, and Z).

FIG. 4F illustrates the edges 450b. An edge, such as the edge 454, is a connection between two of the vertices 450a. The edges represent the connectivity information of a mesh as they connect one vertex to another vertex.

FIG. 4G illustrates the faces 450c. A face, such as the face 456, is a set of edges that when closed form a polygon. A face can represent connectivity information of a mesh as it is formed by connecting multiple vertices together. A face 456, as is illustrated in FIG. 4G, is composed of three different edges. It is noted that a face can be a variety of polygons such as a quad face which is composed of four edges.

In certain embodiments, in addition to each vertex, such as the vertex 452, having a geometric location, each vertex can have one or more attributes. The attributes associated with a face can be a weighted combination of the attributes of the vertices that are connected to the edges which form the face.

Figure 4H:
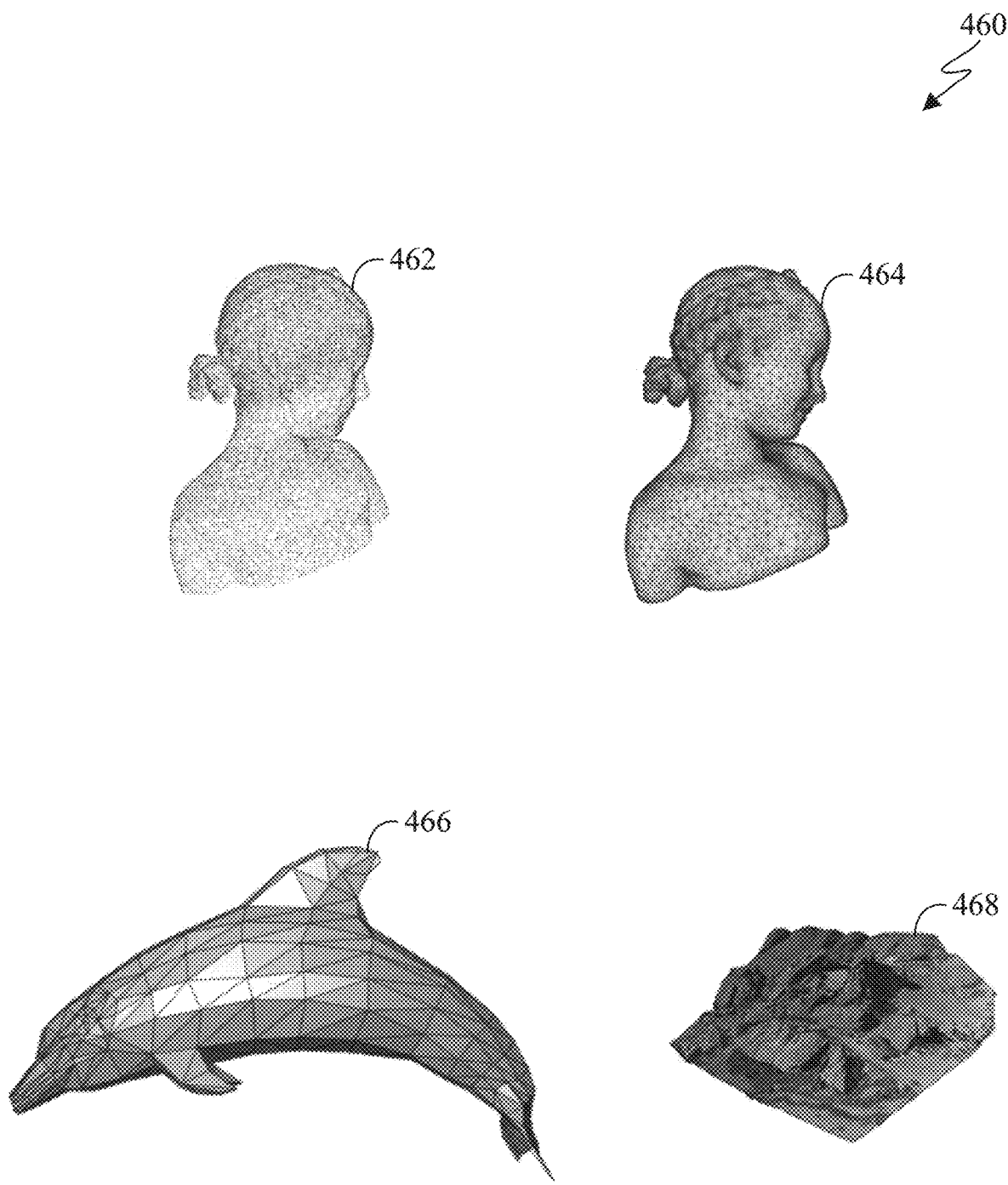
FIG. 4H illustrates example 3D objects such as point clouds, meshes, and scenery in accordance with an embodiment of this disclosure

FIG. 4H illustrates example 3D objects 460 such as point clouds, meshes, and scenery in accordance with an embodiment of this disclosure. For example, FIG. 4H illustrates an example point cloud 462 and an example mesh 464 in accordance with an embodiment of this disclosure.

The point cloud 462 depicts an illustration of a point cloud. The point cloud 462 includes multiple points that visually define an object in 3D space, similar to the 3D object 400 of FIG. 4A and the 3D object 406 of FIG. 4B. Each point of the point cloud 462 represents an external coordinate of the object, similar to a topographical map. Each point includes a geographical location and one or more attributes. The attributes of each point can also include texture, color, intensity, texture, motion, material properties, reflectiveness, and the like.

Similarly, the mesh 464 depicts an illustration of a 3D mesh, similar to the 3D object 400 of FIG. 4A and the 3D object 406 of FIG. 4B. The mesh 464 illustrates the external structure of an object that is built out of polygons. For example, the mesh 464 is a collection of vertices (similar to the vertices 450a of FIG. 4E), edges (similar to the edges 450b of FIG. 4F) and faces (similar to the faces 450c of FIG. 4G) that define the shape of an object. The mesh 464 is defined by many polygonal or triangular interconnectivity of information between the various points. Each polygon of the mesh 464 represents the external surface of the object. The vertices of each polygon are similar to the points in the point cloud 462. Each polygon can include one or more attributes such as texture, color, intensity, texture, motion, material properties, reflectiveness, and the like.

The mesh 466 illustrates a triangular mesh. Triangular meshes are polygonal meshes in which the faces of the mesh are triangles similar to the face 456. The scenery 468 illustrates that a point cloud or point mesh can include multiple items or a scene instead of a solitary figure.

Figure 4I:
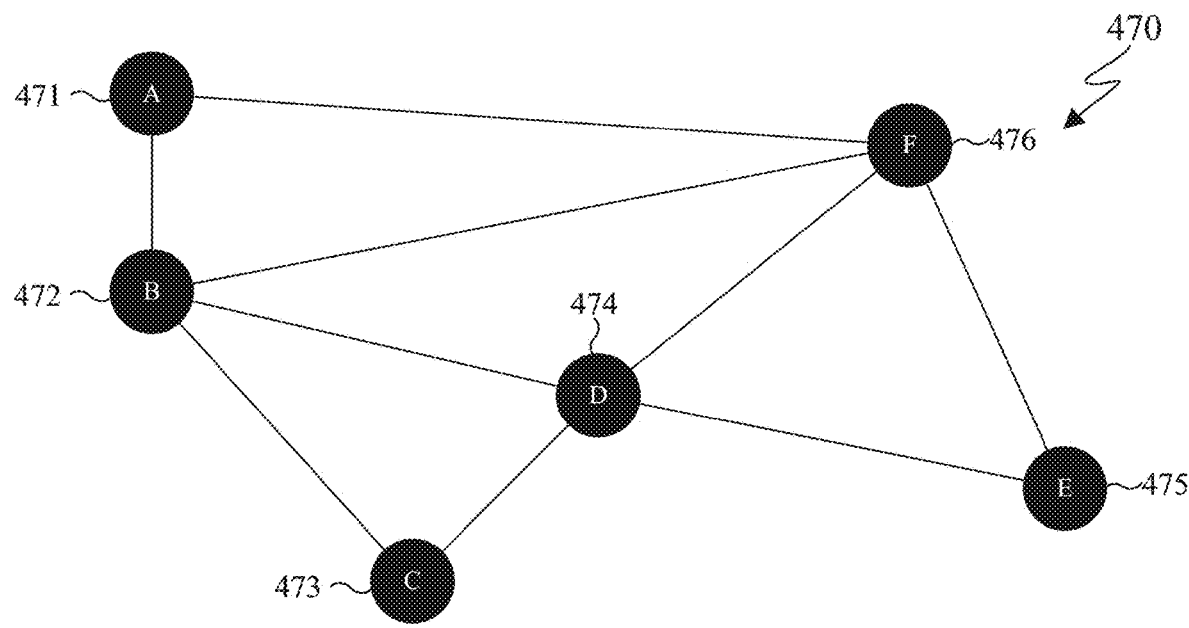
FIGS. 4I and 4J illustrate example meshes in accordance with an embodiment of this disclosure.
Figure 4J:
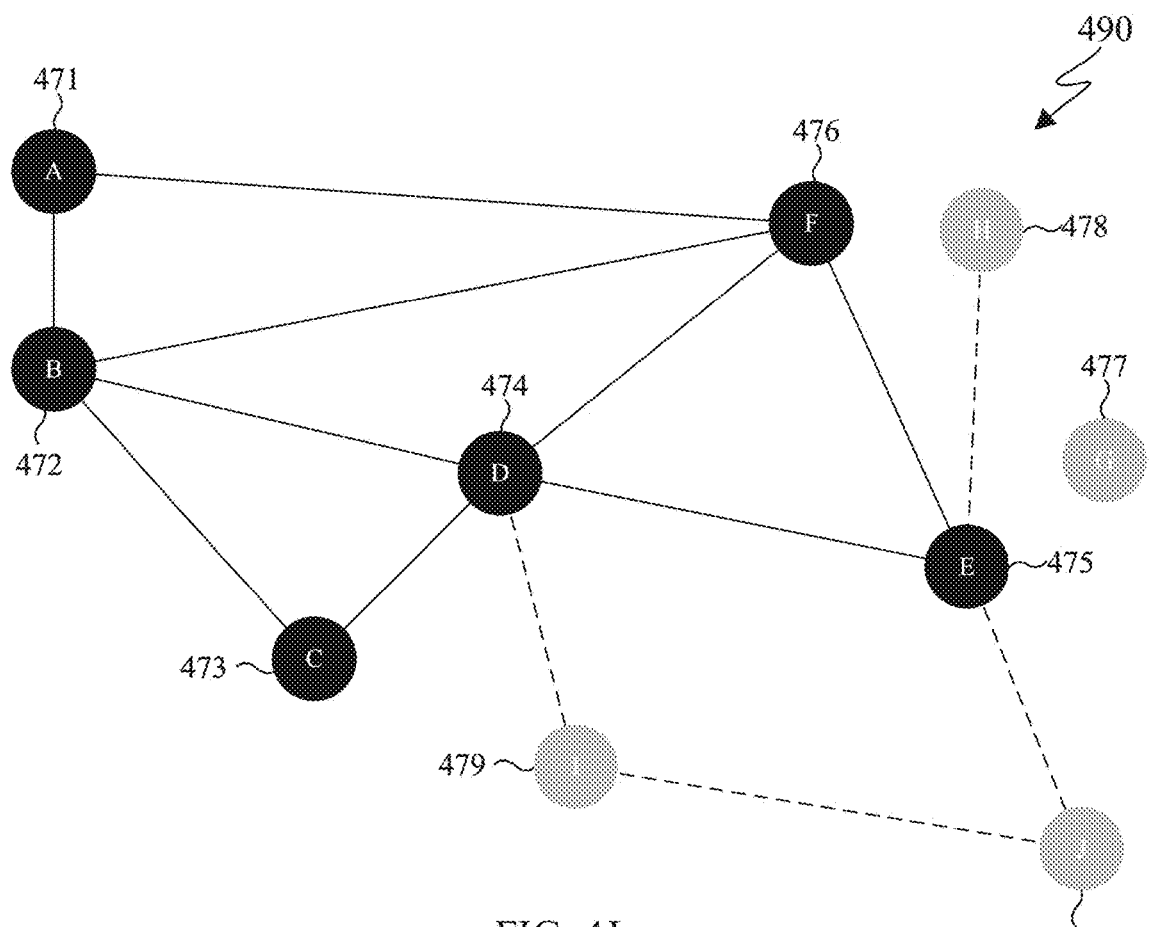

FIGS. 4I and 4J illustrate example meshes 470 and 490 in accordance with an embodiment of this disclosure. It is noted that the mesh 470 of FIG. 4I is a valid mesh while the mesh 490 of FIG. 4J is an invalid mesh based on the following reasons.

A mesh, such as the mesh 470 is described by its vertices in terms of their position in 3D space. The edges of a mesh specify the connectivity between the vertices. For certain meshes, it is possible to describe the connectivity between the vertices as a list of polygons instead of edges. For example, the mesh 470 of FIG. 4I is an example of a triangle mesh. It has six vertices (vertex A 471, vertex B 472, vertex C 473, vertex D 474, vertex E 475, and vertex F 476). Each vertex may be described in terms of its 3-D position (x, y, z). The connectivity between the vertices may be described as the following set of edges: such as AB, AF, BC, BF, CD, DB, DF, DE, and EF. Each polygon of the mesh 470 can be described based on the following sets of triangles: ABF, BCD, BDF, and DEF.

There is no direction associated with the edges, that is, the edges are undirected so that edge AB (between vertex A 471 and vertex B 472) is the same as edge BA (between vertex B 472 and vertex A 471). However, the order of vertices for specifying a triangle imposes an orientation (direction of a normal vector, which is perpendicular to the face of the triangle) on that triangle.

In certain embodiments, a mesh is processed so that the following three conditions are satisfied. The first condition is that there are no duplicate vertices or edges. The second condition is that there is no edge that connects a vertex to itself. The third condition is that the set of vertices form a connected component set. A connected component set specifies that it is possible to travel from any vertex to any other vertex using the edges. If the set of vertices does not form a connected component set, the set of vertices may be subdivided into subsets such that each subset forms a connected component set. Please note that this definition is broad and allows for non-manifold meshes.

An additional condition is included for triangular meshes. A fourth condition, for triangular meshes, specifies that mesh can be described as a union of triangles such that any pair of triangles at most have one edge in common.

The mesh 490 of FIG. 4J includes one or more vertices or edges that do not satisfy the three conditions for a mesh (or four conditions for a triangular mesh). As shown in the mesh 490, certain vertices (such as vertex A 471, vertex B 472, vertex C 473, vertex D 474, vertex E 475, and vertex F 476) and their corresponding edges (such as AB, AF, BC, BF, CD, DB, DF, DE, and EF) are the same vertices and edges of the mesh 470 of FIG. 4I. It is noted that the mesh 490 includes additional vertices (such as vertex G 477, vertex H 478, vertex I 479, and vertex J 480) and edges (such as edges EH, EJ, JI, and DI). As such, since the vertex G 477, the vertex H 478, the vertex I 479, and the vertex J 480 and the edges associated with those vertices fail one or more of the conditions, these vertices are not part of the mesh.

As discussed above, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively.

In certain embodiments, the meshes are dynamic in the sense that the number of vertices, vertex positions, attributes, and the connectivity information may change from one time instance to another. Each time instance of the mesh may be referred to as a frame.

Although FIGS. 4A through 4J illustrate example 3D objects including point clouds and meshes, and 2D frames representing a point cloud, various changes can be made to FIGS. 4A-4J. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. Additionally, the patches included in the frames can be overlapping patches. FIGS. 4A, 4B, 4C, and 4D do not limit this disclosure to any particular 3D object(s) and 2D frames representing the 3D object(s).

Figure 5:
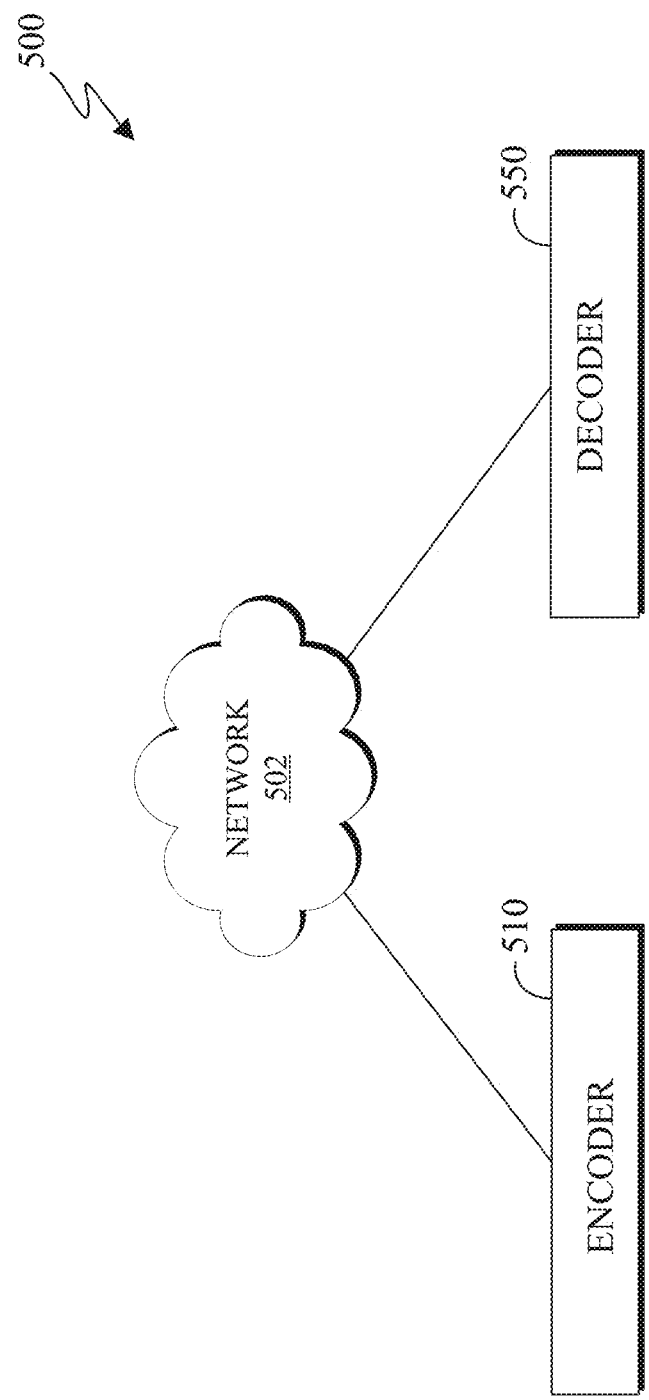
FIG. 5 illustrates a block diagram of an example environment-architecture in accordance with an embodiment of this disclosure.

FIG. 5 illustrates a block diagram of an example environment-architecture 500 in accordance with an embodiment of this disclosure The embodiment of FIG. 5 is for illustration only. Other embodiments can be used without departing from the scope of this disclosure.

The example environment-architecture 500, as shown in FIG. 5, includes an encoder 510 and a decoder 550 in communication over a network 502.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

Generally, the encoder 510, receives 3D media content, such as a point cloud or a mesh, from another device such as a server (similar to the server 104 of FIG. 1, the server 200 of FIG. 2), an information repository (such as a database), or one of the client devices 106-116. In certain embodiments, the encoder 510 can receive media content from multiple cameras and stitch the content together to generate a 3D scene that includes one or more point clouds.

In certain embodiments, the encoder 510 can include two separate encoders a connectivity encoder and a point cloud encoder that is configured to encode a point cloud using a video encoder. The encoder 510 demultiplexes, or separates, the vertex information (vertex coordinates and vertex attribute(s)) from the vertex connectivity information. For example, when the encoder 510 separates, the vertex information from the vertex connectivity information, the vertices can represent a point cloud. In certain embodiments, the encoder 510 can perform direct coding to encode the connectivity information. FIGS. 8A-10 describe direct coding.

The encoder 510 segments points of the mesh or point cloud into multiple patches that represent the projection. For example, the encoder 510 projects the vertices of a mesh or points of a point cloud into multiple patches that represent the projection. The encoder 510 clusters points of a point cloud (or vertices of a mesh) into groups which are projected onto different planes such as an XY plane, an YZ plane, and an ZX plane. Each cluster of points is represented by a patch when projected onto a plane. When a vertex is projected onto a 2D frame, it is denoted as a pixel and identified by the column and row index in the frame indicated by the coordinate (u, v), instead of the (X, Y, Z) coordinate value of the vertex in 3D space. The encoder 510 packs the patches representing the point cloud or mesh onto 2D frames. The 2D frames can be video frames. Additionally, 'u' and 'v' can range from zero to the number of rows or columns in the depth image, respectively.

Each of the 2D frames represents a particular aspect of the point cloud, such as one set of frames can represent geometry and another set of frames can represent an attribute (such as color). It should be noted that additional frames can be generated based on more layers as well as each additionally defined attribute.

The encoder 510 also generates occupancy map frames based on the geometry frames to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v) for reconstruction purposes. An invalid pixel can include information such as padding that can increase the encoding efficiency but does not provide any information associated with the point cloud itself. In certain embodiments, the occupancy map is binary, such that the value of each pixel is either one or zero. For example, when the value of a pixel at position (u, v) of the occupancy map is one, indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid, and therefore does not represent a point of the 3D point cloud.

The encoder also generates atlas frames that include information relating the pixels of the video frames to the point cloud or mesh. For example, the atlas frames can indicate a 3D location of a patch that is stored in the video frames. The atlas frames can also indicate where the patches are located on a 2D grid of a video frame. The atlas frames can also indicate the size of a patch (such as the number of pixels that correspond to a patch).

The encoder 510 transmits frames representing the mesh as an encoded bitstream. The bitstream can be transmitted to an information repository (such as a database) or an electronic device that includes a decoder (such as the decoder 550) through the network 502.

In certain embodiments, the encoder 510 can compress both a geometry frame and a corresponding occupancy map frame. Thereafter the encoder 510 can decode and reconstruct the geometry frames and the occupancy map frames. The reconstructed geometry and occupancy map frames are used to generate the one or more attribute frames. After generating the attribute frames, the attribute frames are compressed. The encoder 510 then multiplexes the encoded connectivity information with the encoded frames to generate a bitstream that can be transmitted to an information repository (such as a database) or another device, such as the decoder 550 via the network 502. It is noted that the encoder 510 encodes the patches (including the vertices and the attributes) using V3C/V-PCC and encodes the connectivity information using direct coding of the edges.

The decoder 550 receives a bitstream that represents media content, such as a point cloud or mesh. The bitstream can include data representing a mesh (or point cloud). The bitstreams can include two separate bitstreams that are multiplexed together such as the connectivity information and the vertex coordinates and attribute(s). The decoder 550 can include two decoders, a point cloud decoder configured to decode a point cloud using a video decoder and a connectivity decoder. The point cloud decoder can decode multiple frames such as the geometry frame, the one or more attribute frames, and the occupancy map. The connectivity decoder decodes the connectivity information. It is noted that the decoder 550 decodes the vertex positions before decoding the connectivity information. The decoder 550 then reconstructs the mesh from the multiple frames and the connectivity information. The reconstructed mesh can then be rendered and viewed by a user.

Although FIG. 5 illustrate the environment-architecture 500 various changes can be made to FIG. 5. For example, any number of encoders or decoders can be included environment-architecture 500.

Figure 6A:
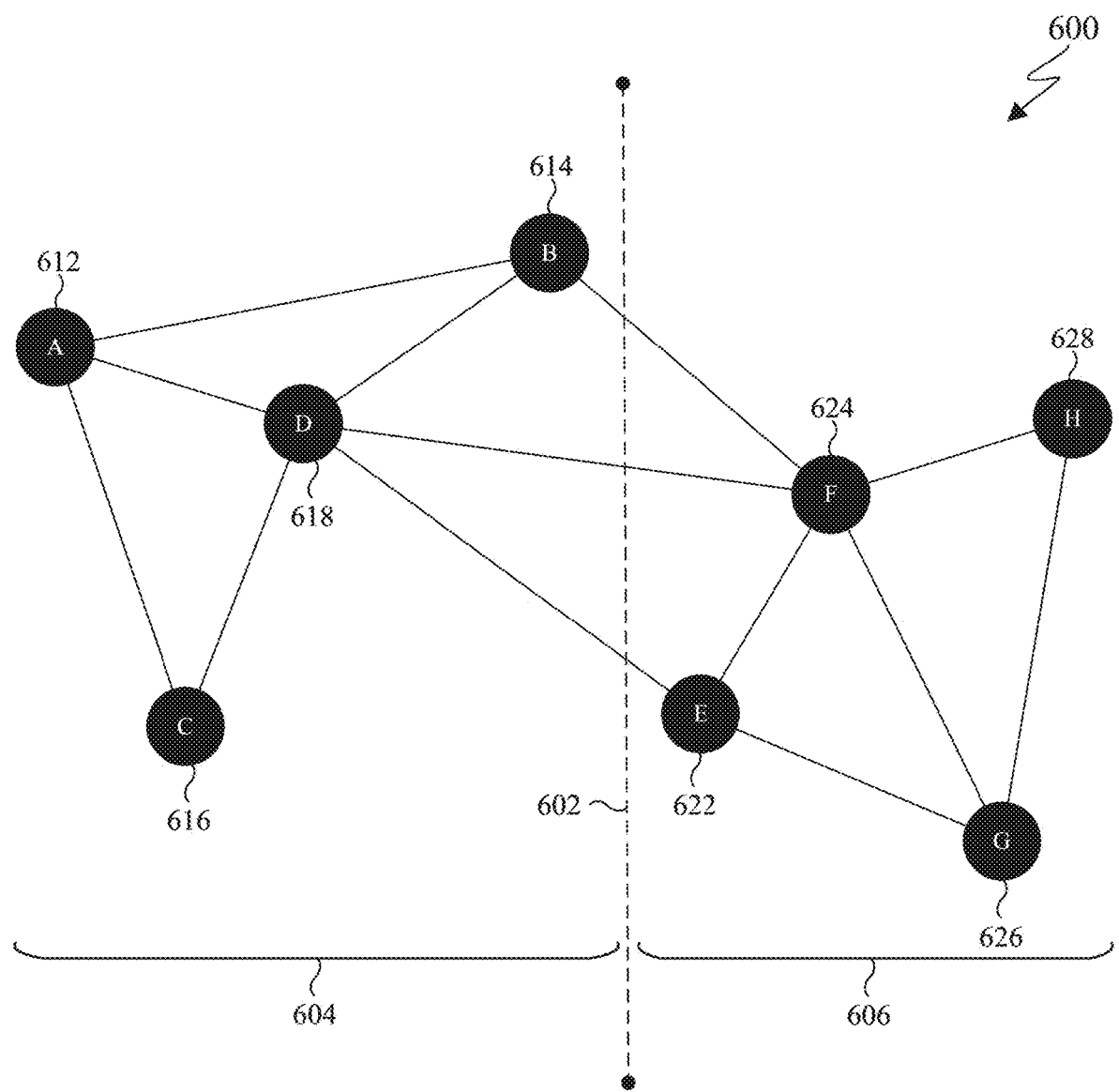
FIG. 6A illustrates an example mesh that includes two non-overlapping patches in accordance with an embodiment of this disclosure.
Figure 6B:
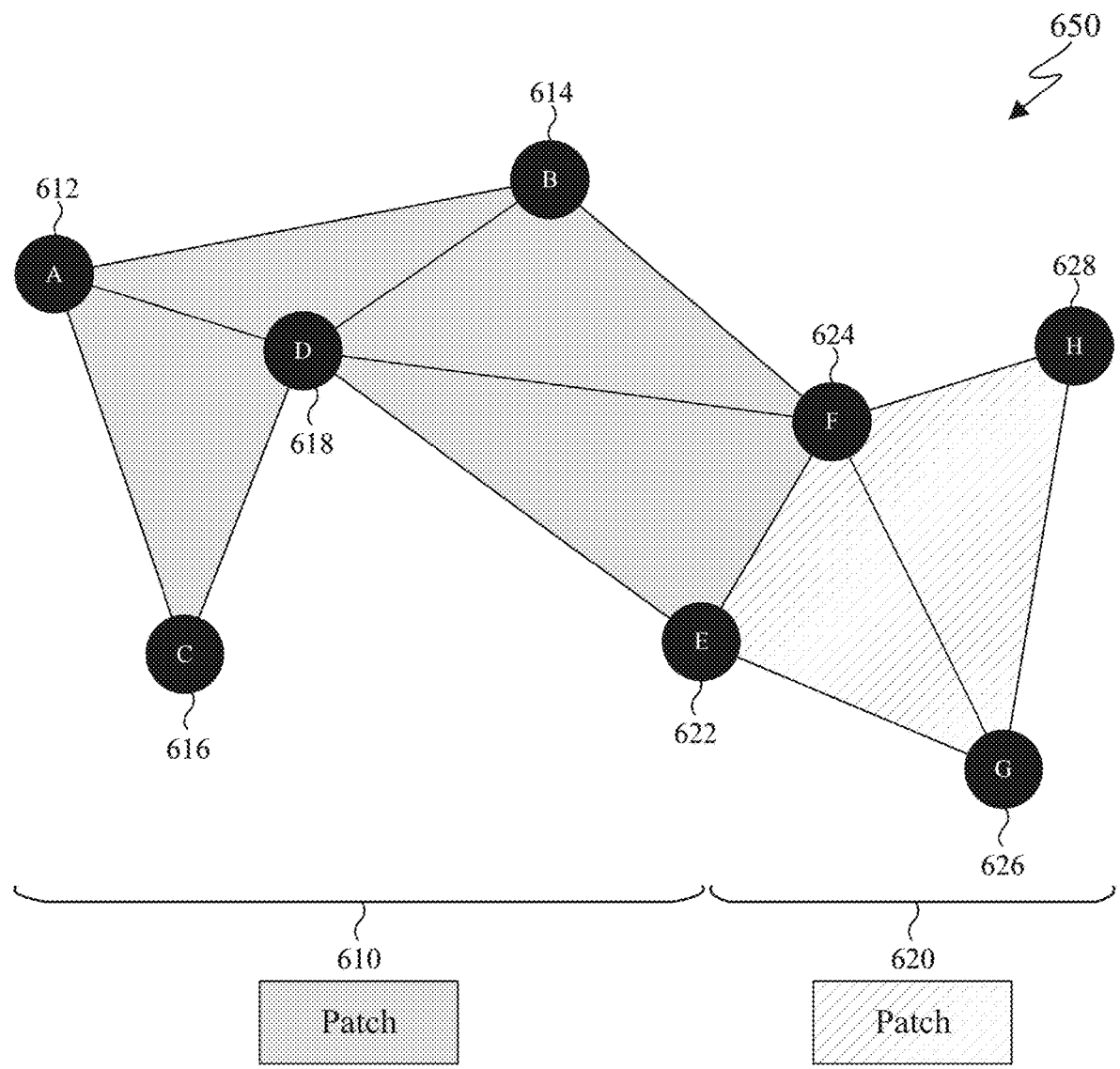
FIG. 6B illustrates an example mesh that includes overlapped patches in accordance with an embodiment of this disclosure.

FIGS. 6A and 6B illustrate example portions of a mesh that include two patches in accordance with an embodiment of this disclosure. In particular, FIG. 6A illustrates an example mesh 600 that includes two non-overlapping patches while FIG. 6B illustrates an example mesh 650 that includes overlapped patches.

FIG. 6A illustrates a portion of a mesh 600 that includes two patches 601 and 606 (that are non-overlapped patches). The mesh 600 includes multiple vertices such as vertex A 612, vertex B 614, vertex C 616, vertex D 618, vertex E 622, vertex F 624, vertex G 626, and vertex H 628. The patch 604 includes the vertex A 612, the vertex B 614, the vertex C 616, and the vertex D 618 and the edges connecting these vertices. The patch 606 includes the vertex E 622, the vertex F 624, the vertex G 626, and the vertex H 628 and the edges connecting these vertices. The patch 604 and 606 are separated by line 602. It should be noted that although all the vertices appear to be in the same plane, this is not the case. The vertices can be in 3D space.

As illustrated, some of the vertices in patch 604 (such as the vertex B 614 and the vertex D 618) are connected to the vertices in patch 606 (such as the vertex E 622 and the vertex F 624). For example, the vertex D 618 of patch 604 connects to the vertex E 622 and the vertex F 624 from patch 606. Similarly, the vertex B 614 from patch 604 connects the vertex F 624 from patch 606. When the 3D patch is projected onto a plane, the vertices that connect to vertices from other patches may not lie on the boundary of the patch. Embodiments of the present disclosure take into consideration that when coding connectivity information, vertices from other patches (not just those belonging to the current patch) should be considered. For example, in order to code the mesh 600, the vertex positions, attribute information associated with each vertex, and the connectivity information should be coded. In addition, if instead of per-vertex texture, a texture map is used, a texture map may be coded as well. The orientation of each polygon (triangle in this case) also should be specified in terms of the order of vertices. As such, vertex reordering, and connectivity information may be coded in the bitstream. The reordering is used since vertices may be different from the order in which the connectivity coder codes the vertices. Reordering information and connectivity information consume large amounts of bits. Moreover, the points in one patch may connect to points in other patches.

Accordingly, embodiments of the present describe a mesh 650 as shown in FIG. 6B. The overlapped patches limits the connectivity information to a single patch. That is, only connectivity inside the patch needs to be coded, for an overlapped mesh patch. Depending on the type of connectivity coding, this may include reordering information for the vertices in the overlapped mesh patch In certain embodiments, an overlapped mesh patch is defined by polygons (such as triangles) and the vertices corresponding to those triangles. FIG. 6B shows an example of the same mesh as in FIG. 6A. However, the overlapped mesh 650 of FIG. 6B includes an overlapped patch 610 and an overlapped patch 620 (instead of the patches 604 and 606 which were connected by the connectivity information).

As illustrated in FIG. 6B, the overlapped patch 610 includes the vertex A 612, the vertex B 614, the vertex C 616, the vertex D 618, the vertex E 622, and the vertex F 624, and the edges connecting these vertices. The overlapped patch 620 includes the vertex E 622, the vertex F 624, the vertex G 626, and the vertex H 628 and the edges connecting these vertices. That is, the vertex E 622, and the vertex F 624 belong to both overlapped patch 610 and overlapped patch 620 of the mesh 650.

It is noted that by including the vertex E 622, and the vertex F 624 in two different patches may result in a loss of coding efficiency. However, when coding the connectivity and reordering information, the overlapped mesh patches are advantageous. For example, for coding connectivity information, the connectivity corresponding to each overlapped patch may be coded independently of other patches. This indicates that only the connectivity information corresponding to other points within the patch needs to be coded. Also for reordering information, only the points within each patch need to be considered instead of all the vertices. For example, if an overlapped patch includes 256 vertices and the total number of vertices of the mesh is 1024, in a straightforward fixed-length coding of reordering information, only 8 bits per vertex are needed instead of 10 bits.

The 3D overlapped patch may be projected onto a 2D plane using the six projection directions such as the projection plane 410, 412, 414, 416, 418, and 420 of FIG. 4B. Additional projection directions such as those corresponding to 45° angles may be considered as well. The occupancy value for the positions on the 2-D atlas representing vertices can be equal to 1 and is 0 elsewhere.

The geometry frame includes of depth values corresponding to the projection direction for the vertices in the overlapped mesh patch.

In case of per-vertex attributes, the attribute frame includes the attribute for the vertices in the overlapped mesh patch. In one embodiment, the per-vertex attributes may be in the form of (u, v), which may point to a position in a texture map associated with the mesh. In this embodiment, the texture map would need to be sent separately (possibly in a compressed form). The separate texture map may be treated as an additional attribute, with no corresponding geometry or occupancy information. In other embodiments, the texture map can be coded as an auxiliary video such as an enhanced occupancy mode (EOM) patch. In other embodiments, in the attribute frame, the interior pixels of each triangle in the overlapped mesh patch are assigned attribute values derived from the texture map using suitable interpolation and mapping. In this embodiment, it is not necessary to code the separate texture map as additional attribute.

In certain embodiments, overlapped mesh patches are restricted to a single map instead of multiple maps that share occupancy information, to allow for structures with thickness.

In certain embodiments, if overlapped mesh patches are compressed in a lossy manner, the positions of the vertices may change. In such a case, depending on the magnitude of the quantization error in vertex positions, the mesh connectivity may have to be modified. In one embodiment, the modified connectivity is coded in a lossless manner in the bitstream To generate an overlapped patch, the encoder, such as the encoder 510, generates a list (which for this example is denoted as unused list), and places all the triangles defining the meshes in the unused list. The encoder 510 identifies the normal vector for each triangle in the unused list. The encoder 510 then assigns each triangle to one of the six classes where the six classes represent the six projection directions: X, Y, Z, and their opposite directions (such as one of the projection plane 410, 412, 414, 416, 418, and 420 of FIG. 4B).

An overlapped mesh patch is initialized to one triangle from the unused list and that triangle is removed from the unused list. For example, the encoder 510 selects one triangle (denoted as first triangle) from the unused list and initializes an overlapped patch associated with that triangle. Then, each triangle from the unused list that satisfies two predefined conditions is added to the overlapped mesh patch that includes the first triangle and is removed from the unused list. The first predefined condition for adding a new triangle to the patch specifies that the triangle shares a vertex with the first triangle. In certain embodiments, the first predefined condition for adding a new triangle to the patch is modified to specify that the triangle shares an edge with the first triangle (instead of a vertex). The second predefined condition for adding a new triangle to the patch specifies that the triangle is also classified to the same class as the first triangle. That is, for each triangle from the unused list that (i) shares a vertex with the first triangle (or any other triangle in the patch), and (ii) is also classified to the same class, are added to the overlapped mesh patch and is removed from the unused list. The encoder 510 continues this process until there are no triangles in the unused list that are assigned to the same class as the overlapped mesh patch and share a vertex with any triangle that belongs to the overlapped mesh patch.

Once the overlapped mesh patch is created, the encoder 510 determines whether any other triangles are included in the unused list. When additional triangles are included in the unused list, the encoder 510 initializes another patch with a triangle from the unused list and the process (described above) is repeated. The process continues until there are no more triangles remaining in the unused list.

It is noted that the close the normal vectors of the triangles in the overlapped patch are closest to a projection direction of the overlapped patch. The term closest term closest can be defined as the projection direction that forms the smallest angle with the normal vector. Stated differently, if the normal vector and the projection directions have all been normalized to have unit magnitude, then the projection directions X, Y, and Z correspond to vectors (1, 0, 0), (0, 1, 0) and (0, 0, 1), respectively. Here, projection direction X indicates that the vertices are projected onto YZ plane. Similarly, projection directions Y and Z indicate that the vertices are projected onto XZ and XY planes, respectively. Similarly the −X, −Y, and −Z directions correspond to (−1, 0, 0), (0, −1, 0) and (0, 0, −1), respectively.

If the unit normal vector is represented as expressed in Equation (1), shown below, then the dot product between the normal vector n and a projection direction p represents the cosine of the angle between them. This assumes that all vectors have unit magnitude. For example, $\theta_x$ is the angle between the normal vector n and projection direction X, shown in Equation (2).

$$n = (n_x, n_y, n_z) \quad (1)$$

$$\cos(\theta_x) = 1 * n_x + 0 * n_y + 0 * n_z = n_x \quad (2)$$

Accordingly, the closest projection axis is the one for which the magnitude of the normal vector component in that direction is the largest. The sign of that component determines whether that projection direction is positive or negative. For example, if largest magnitude was for component $n_y$ but the sign was negative, then, the closest projection direction is −Y.

After an overlapped mesh patch is generated, the overlapped mesh patch can be projected into two dimensions. Due to the specific way in which the patch is generated, after projection to 2D, a planar triangular graph is generated for the corresponding patch. As such, none of the edges of the graph intersect (cross) with another edge. Therefore, the connectivity information associated with a planar graph can be compressed with better efficiency.

A decoder, such as the decoder 550 of FIG. 5 can receive a bitstream that includes overlapped patches. To reconstruct the mesh, the decoder 550 decodes geometry, occupancy map and attribute information corresponding to the overlapped mesh patches. This provides information about the vertices of the triangles of the overlapped mesh as well as the texture or (u, v) values associated with each vertex. Then, the decoder 550 decodes the connectivity information to form the mesh.

In certain embodiments, if the encoder 510 encoded the geometry and occupancy information for all the overlapped mesh patches losslessly, the decoder 550 determines which vertices and edges are repeated and delete them during the reconstruction process.

In certain embodiments, if the encoder 510 encoded the overlapped patches in a lossy manner, for each overlapped patch, the decoder 550 derives a 3D bounding box for the points belonging to the patch. The decoder 550 can use the following syntax elements. syntax elements AtlasPatch3dOffsetU, AtlasPatch3dOffsetV, AtlasPatch3dOffsetD, AtlasPatch3dRangeD, AtlasPatch2dSizeX, and AtlasPatch2dSizeY. The decoder 550 can combine the location of a point, with no quantization errors if that point is represented in two (or more) patches.

For example, if overlapped patches 610 and 620 were encoded in a lossy manner, and those overlapped patches have orthogonal projection directions and 3D bounding boxes that overlap. Examples of orthogonal projection directions are for X and Y, Y and Z, and the like. This example will consider vertex F 624, which is located in both the overlapped patch 610 and the overlapped patch 620 and has an original 3D location at (X, Y, Z). If the projection direction for the overlapped patch 610 is Z, then there is no quantization error for the X and Y coordinates of the reconstructed points from the overlapped patch 610. It is noted that for a projection onto plane XY (in the Z direction) does not introduce quantization noise in the coordinates X and Y. Similarly, if the projection direction for the overlapped patch 620 is Y, then there is no quantization error for the X and Z coordinates of the reconstructed points from the overlapped patch 620. It is noted that for projection onto plane XZ (in the Y direction) does not introduce quantization noise in the coordinates X and Z. Accordingly, an original point (corresponding by vertex F 624) represented in the overlapped patch 610 is located at (X, Y, Z), then the reconstructed point from reconstructed point may be denoted as (X, Y, $\hat{Z}$), where $\hat{Z}$ is a quantized version of Z. That is, the quantized version of vertex F 624 of overlapped patch 610 is (X, Y, $\hat{Z}$). Similarly an original point (corresponding vertex F 624) represented in the overlapped patch 620 is located at (X, Y, Z), then the reconstructed point from reconstructed point may be denoted as (X, $\hat{Y}$, Z), where $\hat{Y}$ is a quantized version of Y. That is, the quantized version of vertex F 624 of overlapped patch 620 is (X, $\hat{Y}$, Z). In this example, the decoder 550 searches for a point that is in overlapped patch 610 and overlapped patch 620 that have the same X coordinate (such as the vertex F 624). The decoder 550 then determines that these points are duplicates of each other and then combines these two points into a single point. To combine these points the decoder 550 (i) knows the X value (as it is the same for the overlapped patches 610 and 620), (ii) derives the Y coordinate of the vertex F 624 from the reconstructed point in the overlapped patch 610 and (iii) derives the Z coordinate of the vertex F 624 from the reconstructed point in overlapped patch 620.

If a duplicate edge is formed due to the process of identifying and combining duplicate points from the overlapped patch 610 and the overlapped patch 620, then only one of the edges is retained. For example, in vertex E 622, and vertex F 624 and the edge EF are duplicated. One side benefit of the method to identify the points duplicated due to overlapped mesh patches is that the retained point has no quantization error with respect to the original point, resulting in bitrate improvements for geometry.

Although FIGS. 6A and 6B illustrate example meshes various changes can be made to FIGS. 6A and 6B. For example, any number of vertices can be included the meshes. For another example, the meshes can be presented as other shapes besides triangles.

Figure 7A:
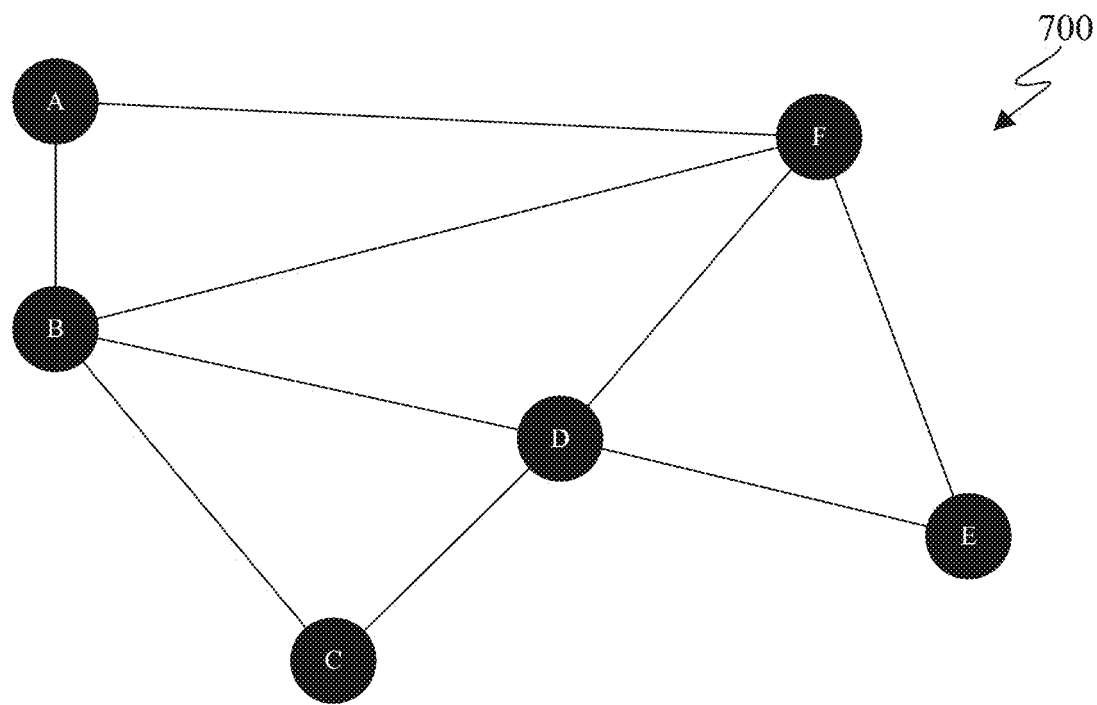
FIGS. 7A-7C illustrate example meshes in accordance with an embodiment of this disclosure.
Figure 7B:
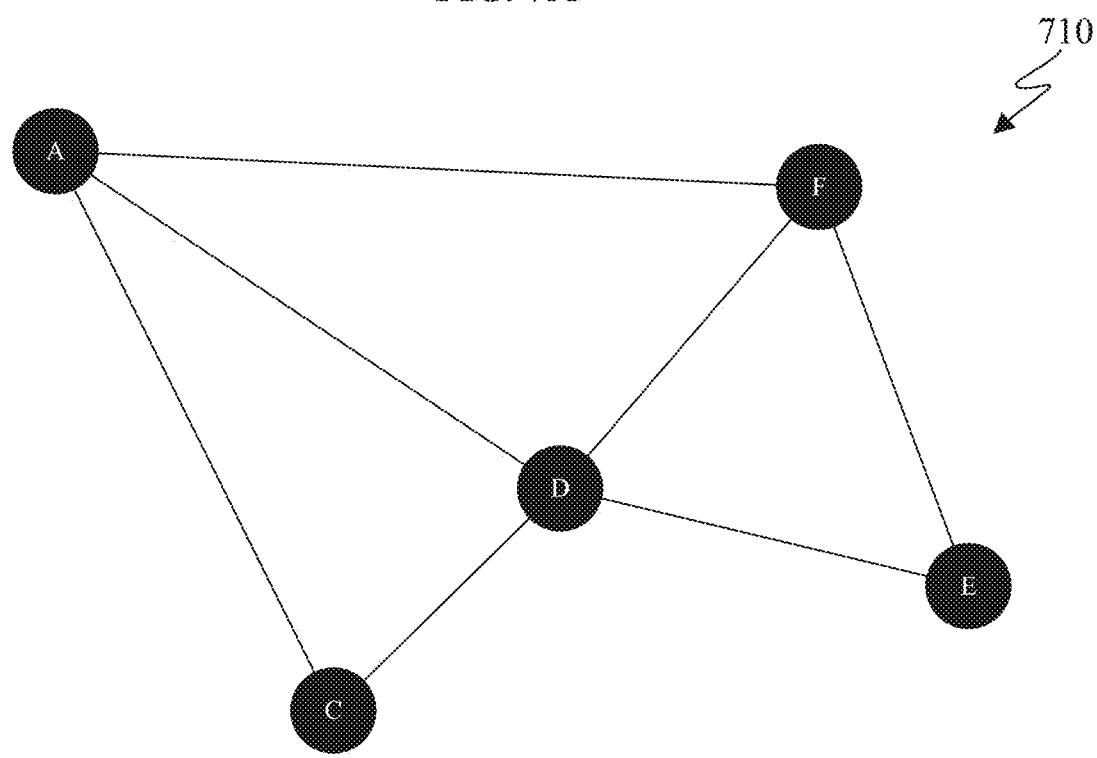
Figure 7C:
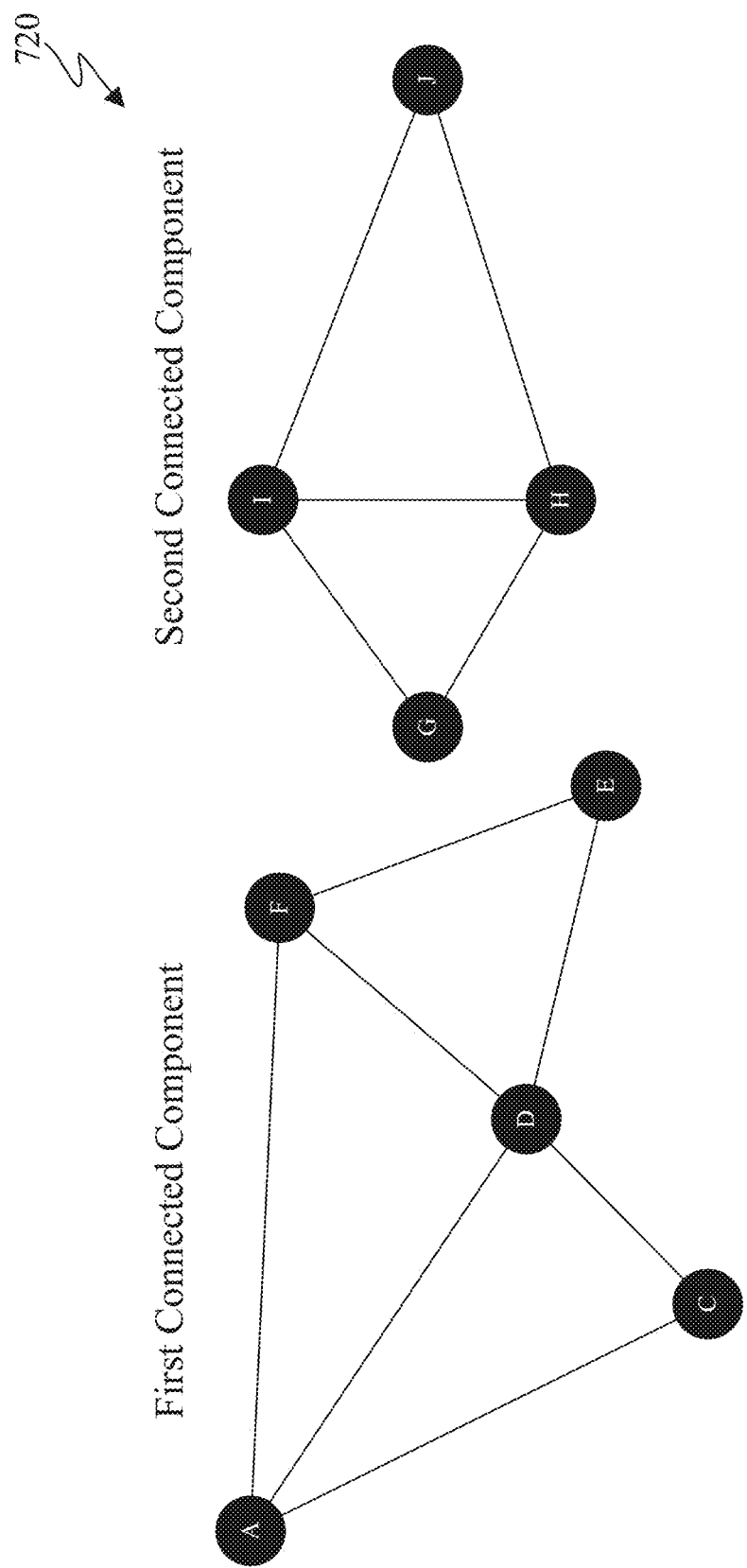
Figure 8A:
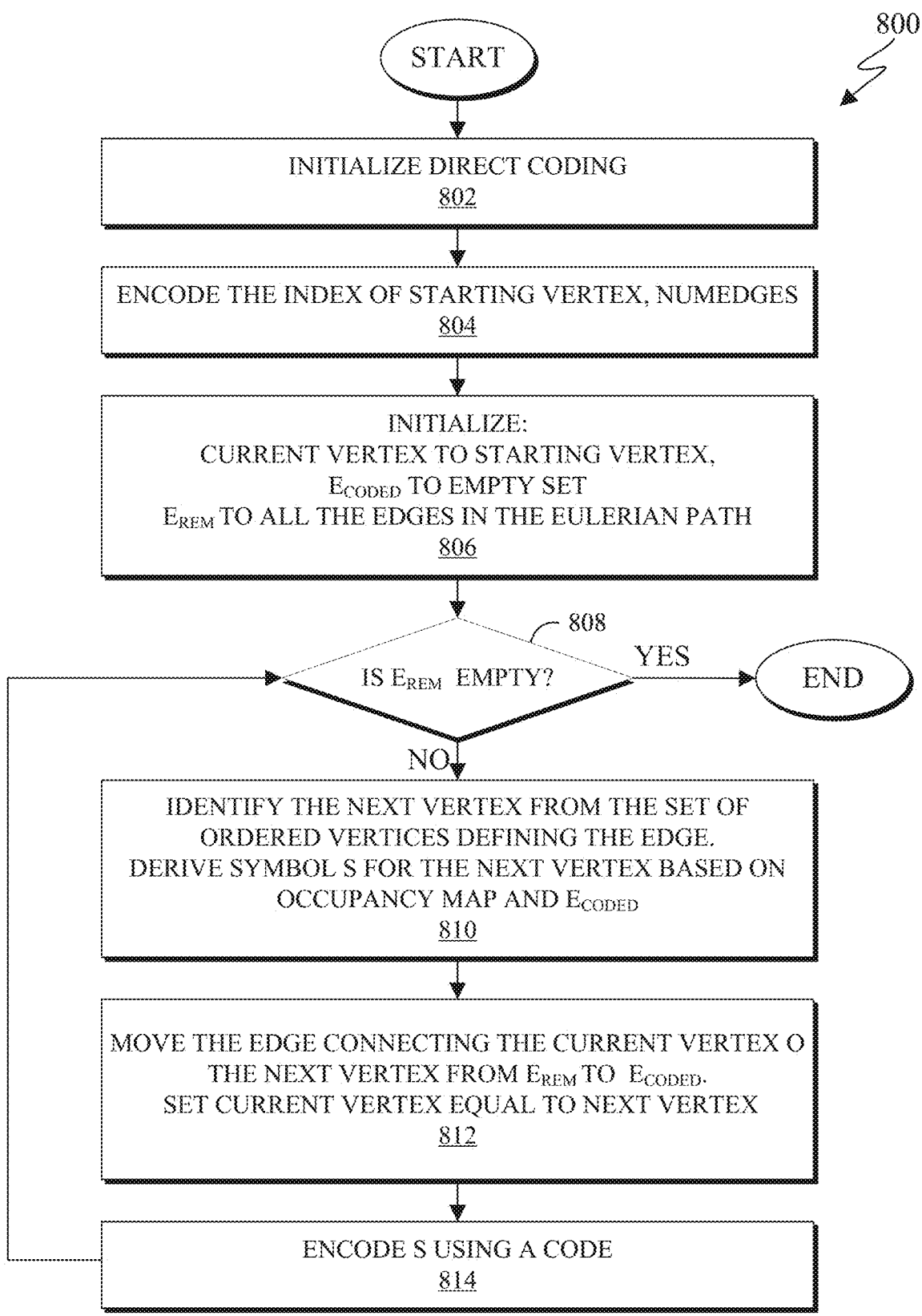
FIG. 8A illustrates an example method for encoding connectivity information of a mesh in accordance with an embodiment of this disclosure.
Figure 8B:
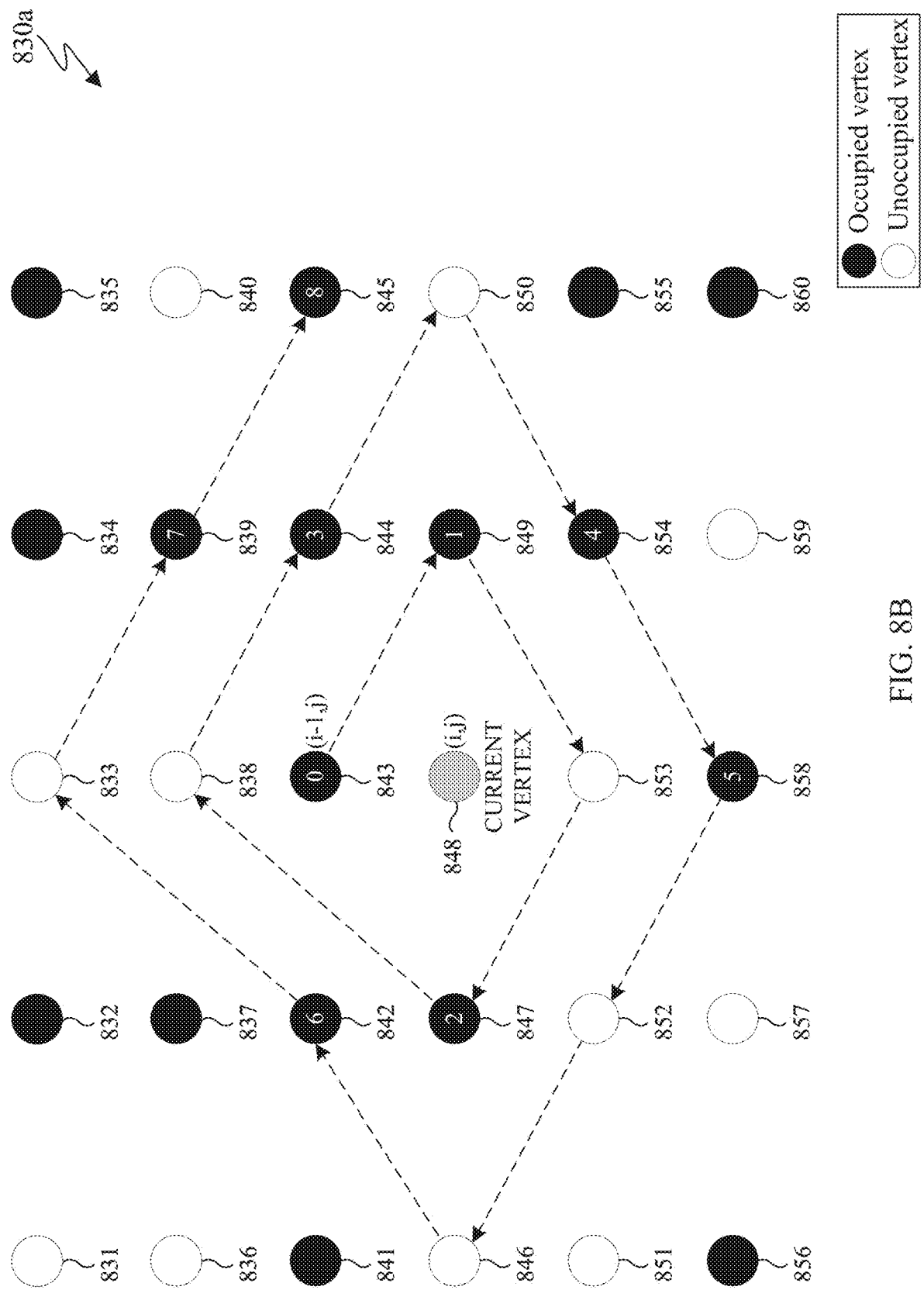
FIGS. 8B, 8C, and 9 illustrate example diagrams for encoding edges in accordance with an embodiment of this disclosure.
Figure 8C:
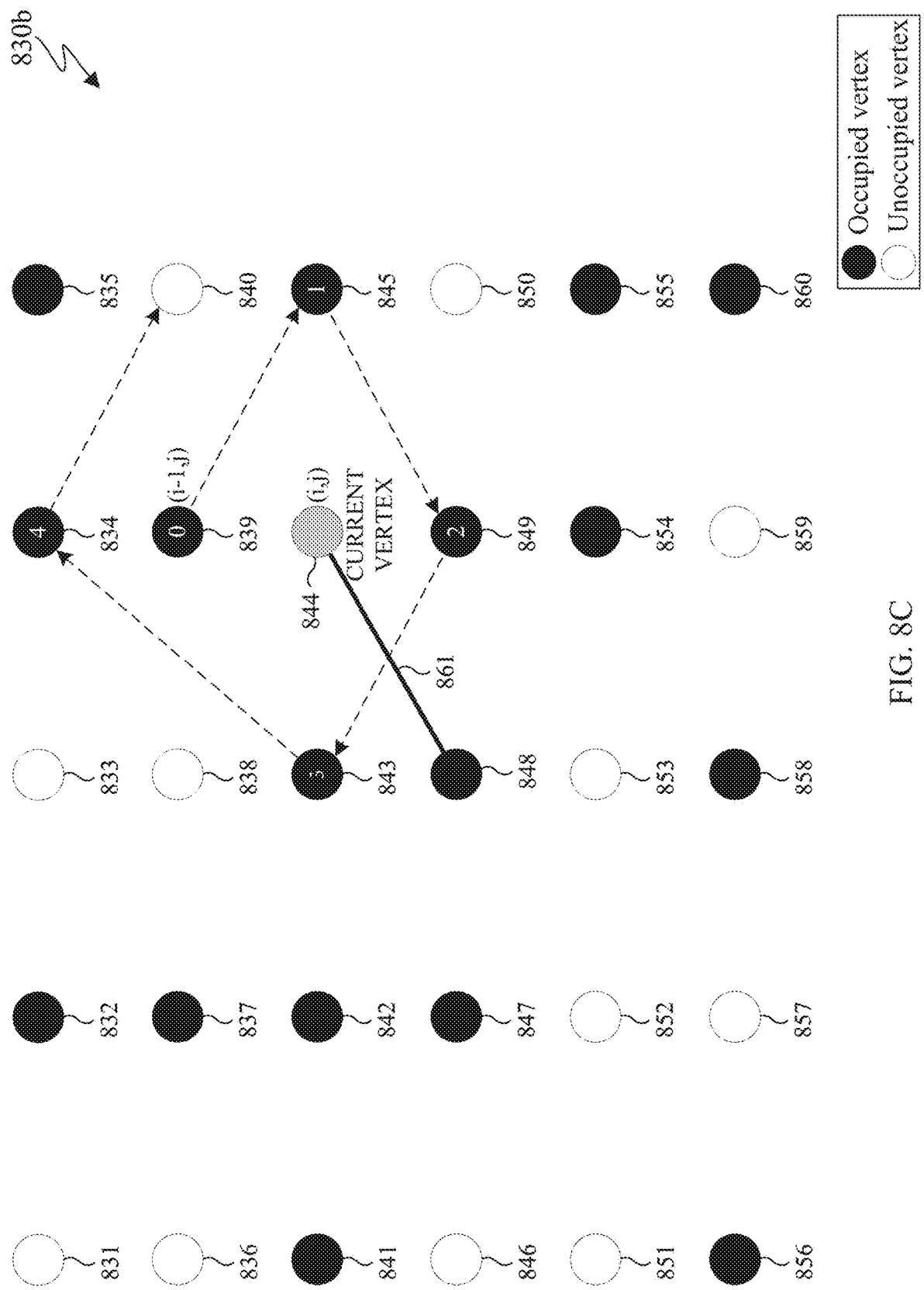
Figure 9:
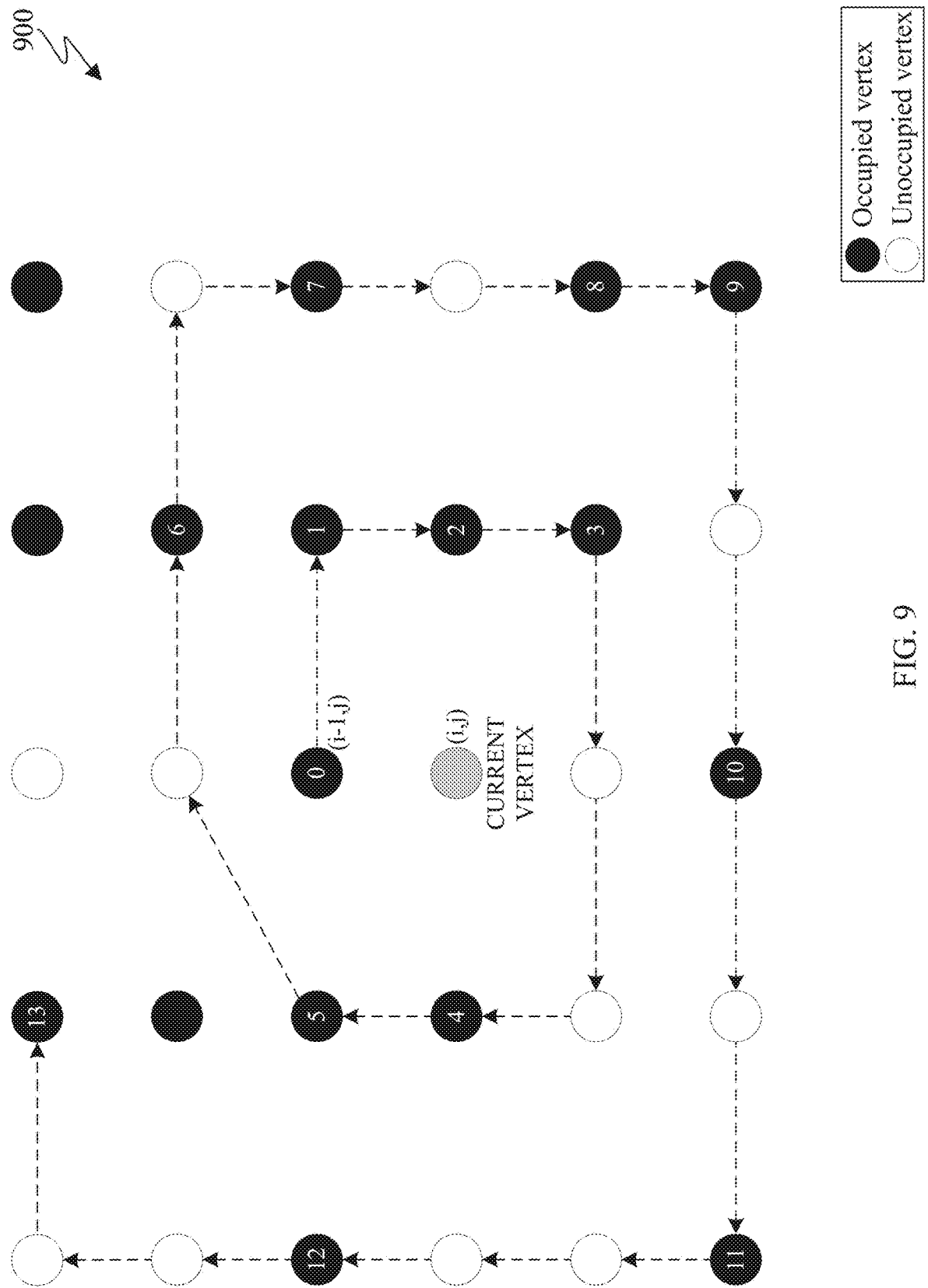
Figure 10:
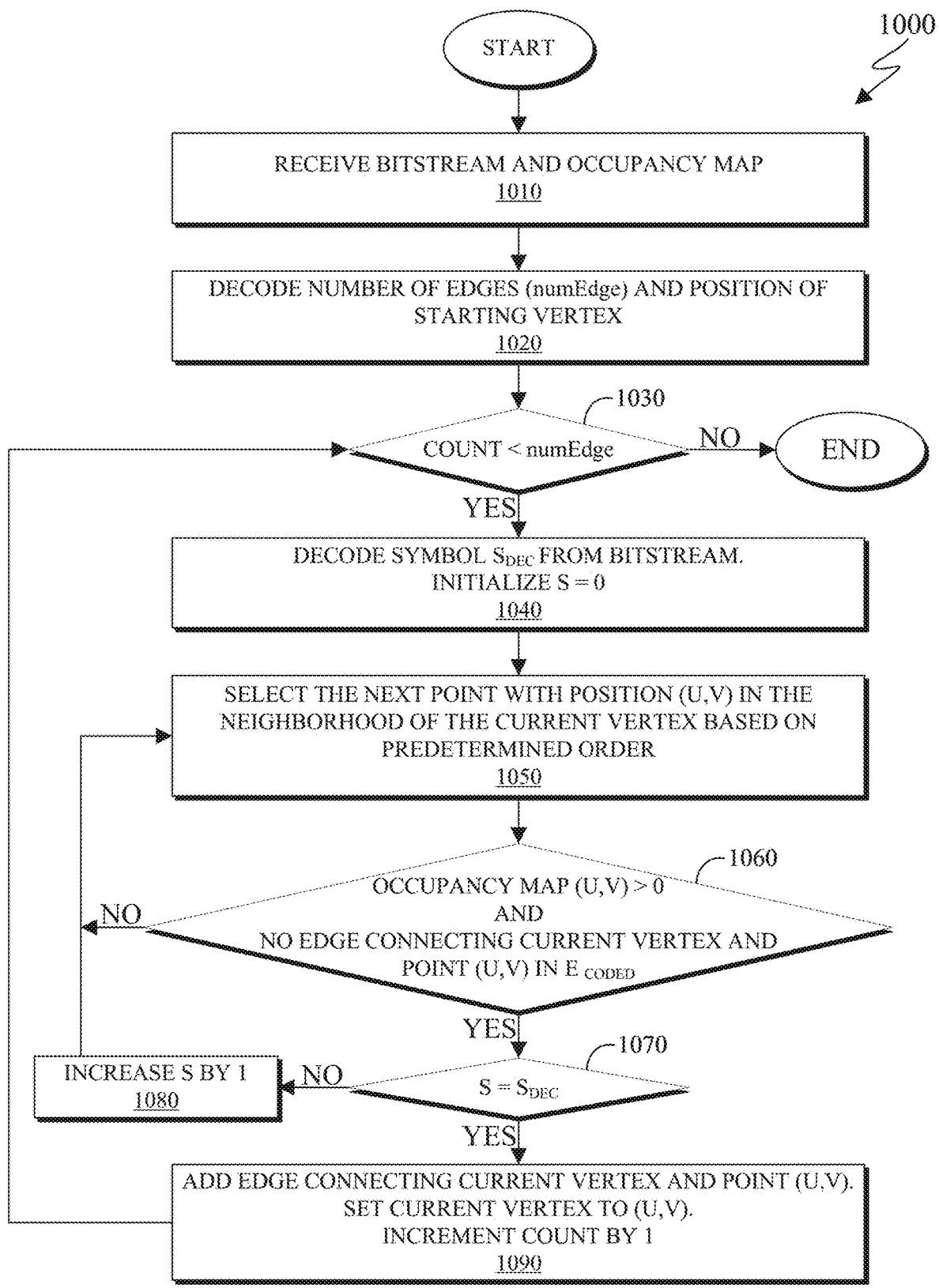
FIG. 10 illustrates an example method for decoding connectivity information of a mesh in accordance with an embodiment of this disclosure.

FIGS. 7A-7C illustrate example meshes 700, 710 and 730, respectively, in accordance with an embodiment of this disclosure. FIG. 8A illustrates an example method 800 for encoding connectivity information of a mesh in accordance with an embodiment of this disclosure. FIGS. 8B, 8C, and 9 illustrate example diagrams 830a, 830b, and 900, respectively for encoding and decoding edges in accordance with an embodiment of this disclosure. FIG. 10 illustrates an example method 1000 for decoding connectivity information of a mesh in accordance with an embodiment of this disclosure.

The methods 800 and 1000 of FIGS. 8A and 10 can be performed by the server 104 or any of the client devices 106-116 of FIG. 1, the server 200 of FIG. 2, the electronic device 300 of FIG. 3 or any other suitable device or system. For ease of explanation, the method 800 is described as being performed by the encoder 510 of FIG. 5 and the method 1000 is described as being performed by the decoder 550 of FIG. 5.

In certain embodiments, when the encoder 510 forms overlapped patches, the connectivity information for each projected patch is coded independently. By encoding the connectivity information for each projected patch independently, reduces the need to code the connectivity information between patches. However, reordering information is needed. If overlapped patches are generated, such as described above, the graph created by projecting the 3D points in a patch on the 2D atlas is a planar graph. Since the normal vectors of each triangles of a particular patch are closest to the same projection direction products a result in which the edges of the overlapped patch do not intersect each other. The resulting property when combined with direct coding can further reduce the number of bits needed to encode the connectivity information.

When the positions of the vertices of a 3D mesh are known in 3D space or 2D space, then the encoder 510 and decoder 550 can perform direct coding of the edges (connectivity information between the vertices and used to form a 3D mesh) associated with the vertices of a patch.

The mesh 700 of FIG. 7A has a similar structure as the mesh 470 of FIG. 4I. As illustrated, the mesh 700 includes size vertices that of A, B, C, D, E, and F. Each vertex may be described in terms of its 3-D position (x, y, z). As described above, a mesh may be described by its vertices in terms of their position in 3-D space and the edges that specify the connectivity between the vertices. For some meshes, it is possible to describe the connectivity between vertices as a list of polygons instead of edges. The connectivity between the vertices of the mesh 700 can be described as the following set of edges AB, BF, FA, BC, CD, DB, DF, DE, and EF.

As discussed above, the encoder 510 can code the position of the vertices in a lossy or lossless manner. FIG. 7B illustrates the mesh 710 based on the reconstructed vertices for the original mesh shown in FIGS. 7A and 4I. As shown in FIG. 7B, due to lossy encoding, vertices A and B now have identical position in the 3-D space. So, vertex B has been eliminated. Furthermore, due to this, some of the edges may be duplicated or may connect a point to itself. In certain embodiments, pre-processing is performed to eliminate such edges based on the reconstructed vertices. Thus the mesh based on reconstructed vertices may be described in terms of vertices A, C, D, E, and F and edges AC, AD, AF, CD, DF, DE, EF. If the point cloud compression is lossless, the mesh based on reconstructed vertices would be identical to the original mesh.

Furthermore, the order of the reconstructed vertices may not be the same as the order of the original vertices for lossy or lossless compression. However, both the encoder 510 and the decoder 550 know the order of the reconstructed vertices. For example, if the number of such vertices be N and the set of all reconstructed vertices be denoted by V, then an edge may be described by a pair of indices (i,j), where 0≤N, i≠j, and i and j correspond to vertices with index i and j, respectively, in the reconstructed order. If a set of all edges in the mesh are denoted by set E, by coding the list of all the edges in E, the connectivity between vertices may be completely specified.

The set of vertices and edges of the mesh can be thought as an undirected graph. It may not be possible to travel from one vertex to another using the edges in set E, such as illustrated in the mesh 720 of FIG. 7C. For example, it is not possible to go from vertices from the set {A, C, D, E, F} to the vertices in the set {G, H, I, J} and vice versa of the mesh 720.

In such a case, as shown in FIG. 7C, the graph may be divided into a set of connected components. Each connected component will have its corresponding edges and vertices. Each connected component is a subgraph in which any two vertices are connected to each other through edges corresponding to that connected component and there are no edges in the graph that connect any vertex in the connected component to any vertices that do not belong to the connected component. As shown in FIG. 7C, there are two connected components. The first connected component of FIG. 7C includes the set of vertices {A, C, D, E, F} and set of edges {AC, CD, AD, AF, DF, DE, EF}. The second connected component of FIG. 7C includes the set of vertices {G, H, I, J} and set of edges {GI, GH, IH, IJ, HJ}.

In certain embodiments, when coding the mesh connectivity, first the number of connected components in the graph are coded and then, the edges in each connected component are coded. The following examples and embodiments describe coding the edges of a graph or mesh that contains a single connected component.

To code the edges of a mesh, the encoder selects a first vertex and find a path through the graph using edges in the set E, defined above, such that all the edges are used and no edge is repeated more than once. The path can visit the same vertex more than once but cannot repeat a previously traversed edge. For example, the first connected component 0 in FIG. 7C, starting with vertex A, such a path would be AC, CD, DA, AF, FD, DE, EF. Here all the seven edges are identified and none of the edges are repeated. In graph theory, such a path is referred to as a Eulerian ring or a Eulerian path, depending on whether the path takes you back to the original vertex or not.

In certain embodiments, when a Eulerian path or ring exists, the encoder 510 can code the order in which the vertices are visited to specify all the edges in the graph. In the above example that would be A, C, D, A, F, D, E, F. It is noted that a Eulerian path or a Eulerian ring may not exist. For example, consider second connected component of FIG. 7C. Regardless of the starting with any vertex, only 4 of the 5 edges can be traversed by a single path. In this example, the remaining edge(s) (in this case, one edge) is coded separately.

To perform direct coding, first the index of the starting vertex for the Eulerian path or ring is coded in the bitstream. Since the position of the vertices can be derived by the decoder, this is equivalent to coding the position of the starting vertex. Then, by coding the next vertex to be visited, an edge is defined (forming the connection between the first vertex to the next vertex). The index or position of the next vertex is coded in an efficient manner till the end vertex in the Eulerian path (or ring) is reached. In certain embodiments, the number of edges (denoted as NumEdges), in the Eulerian ring is coded in the bitstream. In certain embodiments, instead of coding the number of edges, the encoder 510 includes a flag after each edge to define whether it was the last edge in the Eulerian path (or ring).

In certain embodiments, the encoder 510 uses the occupancy information to map the index or position of the vertex into a symbol. This symbol is then encoded using exponential-Golomb, Golomb-Rice or similar codes. The prefix bins of the exponential-Golomb, Golomb-Rice or similar codes may be coded using context-coded arithmetic coding.

The method 800 of FIG. 8A shows an example process for encoding (based on direct coding) the connectivity information (edges) of a mesh along a Eulerian path (or ring). For example, the (i, j) can be the position of the current vertex (where the first coordinate refers to the row index and the second coordinate refers to the column index) and (a, b) is the position of the next vertex. The edge between (i, j) and (a, b) would be the next edge from the Eulerian path (or ring).

In step 802, the encoder 510 initializes direct coding. To initializes direct coding, the encoder 510 obtains the starting vertex, NumEdge, the number of edges in the Eulerian path, the set of ordered vertices defining the edges in the Eulerian path, and the occupancy map. In step 804, the encoder 510 encodes the index of a starting vertex and the NumEdges (which is the number of edges in the Eulerian ring is coded in the bitstream).

In step 806, the encoder 510 initializes (i) the current vertex to a starting vertex, (ii) the expression $E_{coded}$ to empty, and (iii) and $E_{rem}$ to include all the edges in the Eulerian path. The expression $E_{coded}$ denotes the set of edges from the Eulerian path (or ring) that have already been traversed and the expression $E_{rem}$ is the set of edges that have not been traversed and coded so far. It is noted that other terms can be used for the expressions $E_{coded}$ and $E_{rem}$.

In step 808, the encoder 510 determines whether the expression $E_{rem}$ is empty. When the expression $E_{rem}$ is not empty indicates that there are still edges that need to be traversed and coded. Upon determining that $E_{rem}$ is not empty (step 808) the encoder 510 in step 810, identifies the next vertex from the set of ordered vertices defining the edge. The encoder 510, in step 810, also derives a symbol, denoted as S, for the next vertex. The encoder 510 derives the symbol S, based on the occupancy map, and the next vertex (or the next edge). It is noted that the decoder 550 uses the symbol S (derived by the encoder 510), the current vertex, and the occupancy map to identify the next vertex (or edge).

For example, when (i) an occupancy value for a point on the 2-D Atlas with row index m and column index n is denoted by OccMap(m, n), (ii) for the current vertex (i, j), S indicates the next vertex to be encoded, and (iii) S is initialized to −1, then all the points in the neighborhood of vertex (i, j) are traversed in progressively larger squares around the current vertex (i, j). The order in which the points are visited may be different. For example, the order in which the neighboring points are considered is such that the distance between the coordinates of the neighboring points and the coordinate of the current vertex increases monotonically based on a particular metric. In certain embodiments, the metric is the sum of absolute differences of the coordinates. This process is illustrated in FIGS. 8B and 8C.

For example, as shown in FIG. 8B, starting with the current vertex (i−1, j), the dotted arrows show the order in which the points in the neighborhood (i, j) are visited. For each point (u, v) in the neighborhood of (i, j) in a defined order, if OccMap(u, v) indicates that the point is occupied (such as when if OccMap(u, v) is equal to one) and edge connecting current vertex (i, j) and point (u, v) does not belong to $E_{coded}$, S is incremented by 1. For instance, since the vertices 843 and 849 are both valid, the value of S is increased by 1. In contrast, since the vertex 853 is unoccupied, S is not increased.

In step 812, the encoder 510 moves the edge connecting the current vertex from $E_{rem}$ to $E_{coded}$. The encoder 510, also in step 812 sets the current vertex to the next vertex. In step 814, the encoder 510 encodes S using an exponential-Golomb, Golomb-Rice, or similar code.

For example, if (u, v) matches with (a, b), S is coded in the bitstream using exponential-Golomb, Golomb-Rice or similar codes. In one embodiment, the prefix bins of the exponential-Golomb, Golomb-Rice or similar codes are coded using context-based arithmetic coding. The edge between (i, j) and (a, b) is moved from $E_{rem}$ to $E_{coded}$ and the current vertex is set to (a, b).

Thereafter the encoder 510 determines whether $E_{rem}$ is empty (step 808). Upon determining that $E_{rem}$ is empty, the process stops. Otherwise, upon determining that $E_{rem}$ is not empty, S is initialized to −1 and the above process is repeated (such as shown in FIG. 8C).

FIGS. 8B and 8C illustrates the example diagrams 830a, 830b for encoding and decoding the connectivity information. As illustrated, the diagrams 830a, 830b include a number of vertices (vertex 831-860). Some of the vertices are identified, based on the occupancy map, as occupied (such as vertex 832) while other vertices are identified, based on the occupancy map, as unoccupied (such as vertex 831). The numbers within each occupied vertex along the path denote the corresponding symbol, if the edge being encoded is from (i, j) to that particular point.

In certain embodiments, instead of using a single symbol to specify the position of the next vertex, two symbols are used. The first symbol (symbol_1) denotes the index of the square around the current vertex. Nominally, the index corresponds to the metric used above (the sum of absolute differences) minus one. The second symbol (symbol_2) specifies the exact position of the second vertex, based on a predetermined defined order. In one embodiment, the vertices of the square, starting from the vertex directly above the current vertex, are traversed in a clockwise fashion. As before, if none of the vertices for a particular square are possible as the next vertex (due to that vertex not being occupied or the resulting edge being already coded), symbol_1 is not incremented for that particular square. Similarly, within a square, if a specific point cannot be the next vertex (due to it not being occupied or the resulting edge being already coded), symbol_2 is not incremented for that particular point. In certain embodiments, symbol_1 is coded using context-based arithmetic coding.

In certain embodiments, instead of using sum of absolute differences as the metric for defining the squares around the current vertex, maximum absolute difference may be used as shown in FIG. 9. Other metrics such as Euclidean distance may be used as well.

The diagrams 830a and 830b illustrate different time instances of encoding and decoding the mesh. For example, the diagram 830a illustrates that during the encoding process, the encoder 510 starting at the current vertex identifies the next vertex and encodes the corresponding symbol. Similarly, the diagram 830a illustrates that during the decoding process a decoder determines where the edge is to be placed based on the value of a received symbol. This is described in greater detail in FIG. 10. The diagram 830b illustrates that once the vertex is found that vertex becomes the current vertex, and the process repeats. Similarly the diagram 830b illustrates that during the decoding process after the edge is found, the decoder 550 moves to the new current vertex and the process repeats.

The diagrams 830a and 830b illustrate a diamond path that the encoder and decoder can traverse for direct coding of the connectivity information. Other paths can be used, such as the path illustrated in the diagram 900 of FIG. 9. It is noted that the encoder 510 and the decoder 550 traverse the same path when performing direct coding of the connectivity information.

The method 1000 of FIG. 10 shows an example process for decoding (based on direct coding) the connectivity information (edges) of a mesh along a Eulerian path (or ring). The decoder 550 can receive a bitstream that was generated by the encoder 510. The decoder 550 can decode the occupancy map from the bitstream.

In step 1010, the decoder 550 decodes the number of edges (NumEdges) and the position of the starting vertex. For example, (NumEdges) and the index of the starting vertex are decoded from the bitstream or derived from other syntax elements. The position, (rs, cs) can be considered the starting vertex for the Eulerian path (or ring).

In step 1020, the decoder 550 initializes the current vertex to a starting vertex. For example, the current vertex (i, j) is initialized to the starting vertex (rs, cs). The decoder 550, in step 1020, also sets $E_{coded}$, an expression representing the set of edges that have already been traversed, to empty The decoder 550, in step 1020, also sets the expression, count to 0.

In step 1030, the decoder determines whether the count (which was originally set to zero in step 1020 and increased in step 1080, below) is less than NumEdges. While count is less than NumEdges, the steps 1040-1090 are repeated.

Upon a determination that the expression count is less than NumEdges, the decoder 550, in step 1040, decodes a symbol, $S_{dec}$, from the bitstream. The decoder 550 in step 1040 also initializes the variable S to zero.

Then the points in the neighborhood of vertex (i, j) are traversed in progressively larger squares around the current vertex (i, j) in the same predetermined define order that is used on the encoder side. If for a neighboring point (u, v), OccMap(u, v) is greater than 0 and the edge connecting current vertex (i, j) and neighboring point (u, v) does not belong to $E_{coded}$, S is compared with $S_{dec}$. If S is not equal to $S_{dec}$, S is incremented by 1 and the next point in the neighborhood is evaluated as a potential next vertex. That is, in step 1050, the decoder 550 selects the next vertex based on the predetermined order. In step 1060, the decoder 550 determines whether the occupancy map at that position indicates a valid point and that no edge connecting the current vertex to that point is in $E_{coded}$. When one of those conditions is not satisfied, the decoder 550 returns in step 1050 and selects the next vertex based on the predetermined order. Alternatively, when both conditions are satisfied, the decoder 550, in step 1070, determines whether the value of S matches the decoded value of $S_{dec}$. When the value of S is not equal to the decoded value of $S_{dec}$, then in step 1080, the decoder 550 increases the value of S by 1. After the value of S is increased, the decoder 550 returns to step 1050 and selects the next vertex based on the predetermined order.

When the value of S is equal to the decoded value of $S_{dec}$, the decoder 550, in step 1090, adds the edge connecting the current vertex and point (u,v) to $E_{coded}$. The decoder 550, in step 1090, then sets the current vertex as the point (u,v). Additionally, The decoder 550, in step 1090, also increases the count by one. Thereafter the decoder returns in step 1030, to determine whether the count (which was increased in step 1090) is less than the expression NumEdges.

For example, referring to FIG. 8B, the decoder 550 knows that start at vertex 848, the pattern to traverse, and the decoded value of $S_{dec}$. The decoder 550 traverses along the dotted path start at vertex 743 until the value of S is equal to the decoded value of $S_{dec}$. For example, if the decoded value of $S_{dec}$ is 3, then the decoder 550 will traverse along the path until vertex 744. The decoder 550 will start at vertex 743, which corresponds to a symbol value of zero. Since the symbol value of zero (at vertex 743) is not equal to the three (the value of $S_{dec}$), then the decoder 550 traverses to the next valid vertex, vertex 749. As described above, a valid vertex is a vertex that is occupied and if selected would not cause an edge to cross an existing edge. Since the symbol value of one (at vertex 749) is not equal to the three (the value of $S_{dec}$), then the decoder 550 traverses to the next valid vertex, vertex 747. It is noted that the decoder 550 skips the vertex 753 since that vertex is unoccupied. Since the symbol value of two (at vertex 747) is not equal to the three (the value of $S_{dec}$), then the decoder 550 traverses to the next valid vertex, vertex 744. The decoder 550 again skips a vertex, vertex 738 since that vertex is unoccupied. The decoder 550 then determines that the symbol value of three (at vertex 744) is equal to the three (the value of $S_{dec}$). As such, the decoder 550 generates an edge 861 between vertex 748 and 744. The decoder 550 then considers vertex 744 its current vertex, as shown in FIG. 8C. The decoder 550 decodes a new value for $S_{dec}$ The decoder 550 traverses along the dotted path of FIG. 8C starting from vertex 744 until the value of S is equal to the new decoded value of $S_{dec}$.

In certain embodiments, if instead of single symbol (as described in the method 1000), symbol_1 and symbol_2 are used, the procedure is similar. First the square around the current symbol is identified based on symbol_1 and then, the next vertex is identified based on symbol_2.

Although the embodiments described above described the method assuming vertices projected onto 2-D atlas, the method is applicable to vertices in 3-D space as well. In this case the metric (such as sum of absolute differences of coordinates) is calculated for three dimensions. In this case, there are points on 2-D surfaces that are at the same distance from the current vertex, where the distance is defined by the metric used.

In certain embodiments, when overlapped patches are being used for direct coding for a planar graph, the following conditions are satisfied for a point (u, v) to be considered as a potential next vertex in the Eulerian path (or ring). First, OccMap(u, v) was non-zero. That is, the occupancy map indicates that the pixel corresponds to a valid vertex of the point cloud. Second, the edge connecting current vertex (i, j) and (u, v) was not a member of $E_{coded}$. Third, the edge connecting current vertex (i, j) and (u, v) does not intersect with any other edges in $E_{coded}$ except at the vertices. It is noted that the third condition is applicable for a planar graph. Due to these three conditions for a planar graph, the number of points that may be the next vertex in a Eulerian path (or ring) are equal to or smaller than a non-planar case.

In certain embodiments, when overlapped patches are being used, the orientation of the triangles or polygons belonging to a particular overlapped patch is derived based on the projection direction of the patch. For example, the orientation of the triangle is chosen so that the angle between the normal and the projection direction is minimized compared to the case when the opposite orientation would have been chosen.

Although FIGS. 7A-7C, 8B, 8C, and 9 illustrate example meshes various changes can be made to FIGS. 7A-7C, 8B, 8C, and 9. For example, the meshes can include more or less vertices and the connectivity information can form different shapes or connect to the vertices in a different order. Additionally, although FIGS. 8A and 10 illustrate example methods for direct code of the connectivity information, various changes may be made to FIGS. 8A and 10. For example, while the methods 800 and 1000 are shown as a series of steps, various steps in FIGS. 8A and 10 could overlap, occur in parallel, or occur any number of times.

Figure 11A:
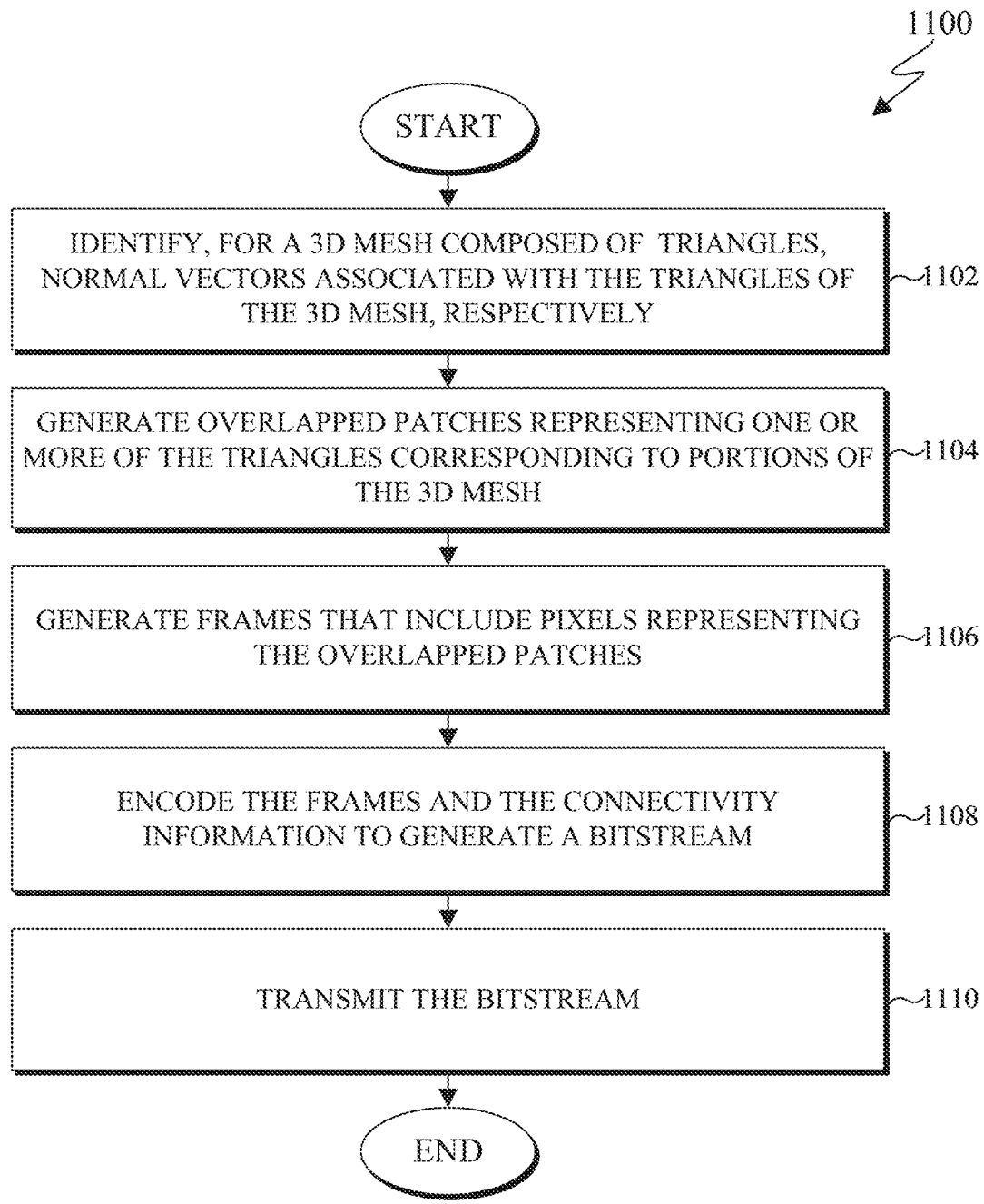
FIG. 11A illustrates example method for encoding a mesh in accordance with an embodiment of this disclosure.

FIG. 11A illustrates example method 1100 for encoding a point cloud in accordance with an embodiment of this disclosure. The method 1100 can be performed by the server 104 or any of the client devices 106-116 of FIG. 1, the server 200 of FIG. 2, the electronic device 300 of FIG. 3, the encoder 510 of FIG. 5A, or any other suitable device or system. For ease of explanation, the method 1100 is described as being performed by the encoder 510 of FIG. 5A.

In step 1102, the encoder 510 identifies, for a 3D mesh that is composed of triangles, normal vectors associated with the triangles of the 3D mesh. For example, the encoder 510 identifies the normal associated with each triangle of the 3D mesh. In certain embodiments, the triangles of the 3D mesh can be other shapes or polygons. The triangles of the 3D mesh are associated with vertices and connectivity information. The connectivity information can include edges that connect to the vertices forming triangles.

In step 1104, the encoder 510 generates overlapped patches. Each overlapped patch represents one or more triangles of the 3D mesh. An overlapped patch represents a portion of the 3D mesh. The encoder generates an overlapped patch such that the normal vectors of the triangles included in the overlapped patch are closest to the projection direction of the overlapped patch. It is noted that two overlapped patches share at least two vertices that are connected by an edge.

In certain embodiments, the projection direction is one projection direction of multiple projection directions, such as one of the projection plane 410, 412, 414, 416, 418, and 420 of FIG. 4B. To generate the first overlapped patch the encoder 510 assigns each triangle of the mesh to a class. To assign a triangle to a class, the encoder 510 compares a direction of the normal vector of the first triangle to the multiple projection places. It is noted that the direction of the normal vector of the first triangle is perpendicular to the external surface of the first triangle. The encoder 510 selects a projection direction based on predefined criteria indicating that the direction of the normal vector of the first triangle is closest to the projection direction. The normal vector of the first triangle is closest to the projection direction is based on the projection direction that forms the smallest angle with the normal vector. The first triangle is assigned to a class that corresponds to the projection direction. That is, for each projection direction, there is a corresponding class. Such that if there are six different projection directions then there are six different classes. So if the normal vector of the first triangle forms the smallest angle with a particular projection direction, then the triangle is assigned to a corresponding class.

After the triangles are all assigned to a particular class, the encoder 510 then selects a first triangle from the multiple triangles that form the mesh. The encoder includes the first triangle in a first overlapped patch. Thereafter, the encoder 510 identifies any additional triangles that are assigned to the same class as the first triangle and that share at least vertex with the first triangle (or any other triangle that is included in the first patch). The identified triangle(s) are added to the first patch. This process continues until there are no triangles that satisfy both conditions (assigned to the same class as the first triangle and that share at least vertex with the first triangle or any other triangle that is included in the first patch).

In certain embodiments, the encoder 510 generates a planar graph that represents an overlapped patch. The planar graph represents the connectivity information corresponding to the overlapped patch. For example, in the planar graph, an edge that connects two vertices will not cross any other edge in that planar graph In step 1106, the encoder 510 generates frames, that include pixels representing the overlapped patched. In step 1108, the encoder 510 encodes the frames and the connectivity information. In certain embodiments, encoder encodes the planar graph using direct coding.

After the frames representing 3D mesh are encoded, the encoder 510 can multiplex the bit-streams to generate a bitstream. In step 1010, the encoder 510 transmits the bitstream. The bitstream can be ultimately transmitted to a decoder, such as the decoder 550.

Although FIG. 11A illustrates one example of a method 1100 for encoding a point cloud, various changes may be made to FIG. 11A. For example, while shown as a series of steps, various steps in FIG. 11A could overlap, occur in parallel, or occur any number of times.

Figure 11B:
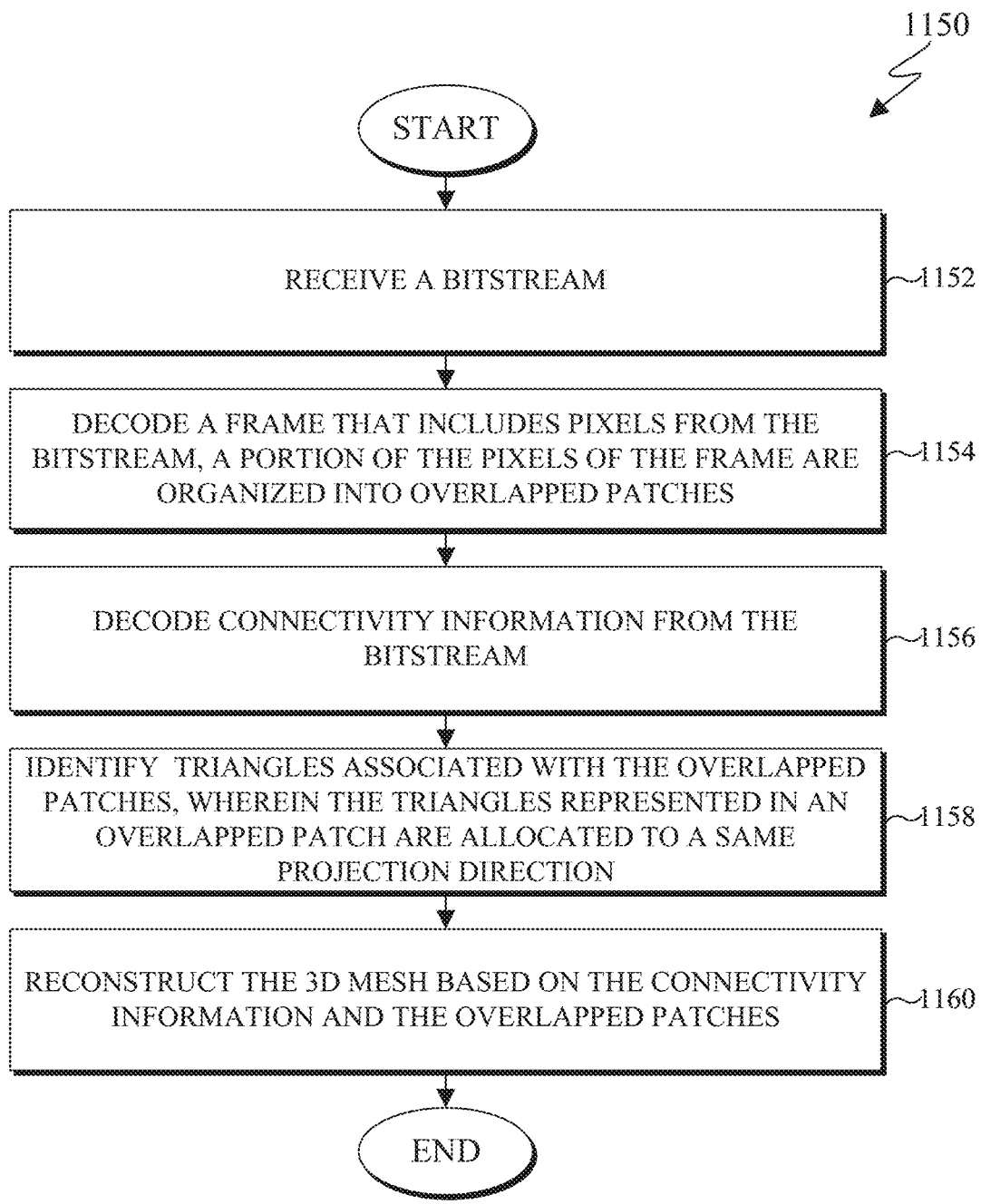
FIG. 11B illustrates example method for decoding a mesh in accordance with an embodiment of this disclosure.

FIG. 11B illustrates example method 1150 for decoding a point cloud in accordance with an embodiment of this disclosure. The method 1150 can be performed by the server 104 or any of the client devices 106-116 of FIG. 1, the server 200 of FIG. 2, the electronic device 300 of FIG. 3, the decoder 550 of FIG. 5A, or any other suitable device or system. For ease of explanation, the method 1150 is described as being performed by the decoder 550 of FIG. 5A.

The method 1150 begins with the decoder, such as decoder 550, receiving a bitstream (step 1152). In step 1154, the decoder 550 identifies from the received bitstream one or more bitstreams representing a 3D mesh.

In step 1154, the decoder 550 decodes, from the bitstream, a frame that includes pixels. A portion of the pixels in the frame represent geometric location of vertices of the 3D mesh. The portion of the pixels in the frame representing vertices of the 3D mesh can be organized into overlapped patches.

In step 1156, the decoder 550 decodes the connectivity information from the bitstream. In certain embodiments, the connectivity information was encoded using direct coding. When the connectivity information was encoded using direct coding, the decoder 550 identifies a symbol from the bitstream. Additionally, when the connectivity information was encoded using direct coding, the decoder 550 decodes or identifies an already decoded occupancy map. The occupancy map indicates which pixels in the frame are valid. For example, each pixel in the occupancy map will include a value. A first value, such as one, indicates that a pixel at the same location in the frame is valid, while a second value, such as zero, indicates that a pixel at the same location in the frame is invalid. A valid pixel corresponds to a vertex of the mesh while an invalid pixel does not correspond to a vertex of the mesh and can be empty or include miscellaneous information such as for padding.

To perform direct decoding, the decoder 550, first selects a pixel in the frame. The decoder 550 then identifies subsequent pixel along a predefined pattern around the first pixel. The subsequent pixel must satisfy two predefined conditions. If the pixel does not satisfy the predefined conditions, then the decoder 550 sequentially moves to the next pixel along the predefined pattern until it finds a pixel that satisfies the conditions. The first condition specifies that the pixel in the frame is identified as valid based on the occupancy map. The second condition specifies that the pixel in the frame is located in the same overlapped patch as the selected pixel. Once a pixel is found that satisfies the two conditions, that pixel is given a symbol (such as a value zero, one, two, three, and the like). The decoder 550 determines whether the symbol associated with that vertex is the same as the decoded symbol. If the symbol of the vertex is not the same as the decoded symbol the decoder 550 traverses the predefined pattern until another pixel is identified that satisfies the conditions. The decoder 550 increases the value of the symbol (such as from zero to one). The decoder 550 then determines whether the symbol associated with that vertex is the same as the decoded symbol. If the symbol of the vertex is not the same as the decoded symbol the decoder 550 continues the process until the symbol of the vertex is the same as the decoded symbol. When the decoder 550 finds symbol of a vertex that is the same as the decoded symbol, the decoder 550 creates an edge between the selected vertex and the current vertex. That current vertex then becomes the starting point for the decoder 550 to traverse the predefined pattern around.

In step 1158, the decoder 550, identifies triangles associated with the overlapped patches. The triangles represented in an overlapped patch are allocated to a projection direction based on a normal vector associated with each of the triangles of the overlapped patch. In certain embodiments, the encoder 550 can identify a transversal direction of the triangle in the overlapped patch based on a projection direction of the overlapped patch.

In certain embodiments, in response to a determination that the frame was encoded losslessly, the decoder identifies a first vertex that is included in a first overlapped patch. Upon a determination that the first vertex matches a second vertex, the decoder 550, removes the first vertex from the first overlapped patch or removes the second vertex from the second overlapped patch.

In certain embodiments, in response to a determination that the frame was encoded in a lossy manner, the decoder 550 identifies a first vertex that is included in both a first overlapped patch and a second overlapped patch. The decoder 550 can then identify a coordinate for the first vertex with minimal quantization error the coordinates of the first vertex as included in the first overlapped patch, the coordinates of the first vertex as included in the second overlapped patch, the projection direction of the first overlapped patch, and the projection direction of the second overlapped patch.

In step 1160, the decoder 550 reconstructs the 3D mesh using the decoded frames and the decoded connectivity information.

Although FIG. 11B illustrates one example of a method 1150 for decoding a point cloud, various changes may be made to FIG. 11B. For example, while shown as a series of steps, various steps in FIG. 11B could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for mesh decoding, the decoding device comprising:
a communication interface configured to receive a bitstream; and
a processor operably coupled to the communication interface, the processor configured to:
decode a frame that includes pixels from the bitstream, wherein a portion of the pixels of the frame represent geometric locations of vertices of a three dimensional (3D) mesh that are organized into overlapped patches,
decode connectivity information from the bitstream,
identify triangles associated with the overlapped patches, wherein the triangles represented in an overlapped patch of the overlapped patches are allocated to a projection direction closest to a normal vector associated with each of the triangles of the overlapped patch, and
reconstruct the 3D mesh based on the connectivity information and the overlapped patches.

2. The decoding device of claim 1, wherein:
the overlapped patches include a first overlapped patch and a second overlapped patch; and
the processor is further configured to:
in response to a determination that the frame was encoded losslessly, identify a first vertex that is included in the first overlapped patch and a second vertex that is in the second overlapped patch;
determine that the first vertex matches the second vertex; and
remove the first vertex from the first overlapped patch or second vertex from the second overlapped patch while the 3D mesh is reconstructed.

3. The decoding device of claim 1, wherein the processor is further configured to:
in response to a determination that the frame was encoded in a lossy manner, identify a first vertex that is included in a first overlapped patch and a second vertex that is in a second overlapped patch, wherein the first and second vertices are represented by three coordinates and wherein the first overlapped patch is projected in a first projection direction and the second overlapped patch is projected in a second projection direction;
determine that the first vertex matches the second vertex based on the first and second vertices sharing a first coordinate;
modify a second coordinate of the first vertex to match a second coordinate of the second vertex; and
modify a third coordinate of the second vertex to match a third coordinate of the first vertex.

4. The decoding device of claim 1, wherein the processor is further configured to determine a traversal direction of a triangle of the overlapped patch based on a projection direction of the overlapped patch.

5. The decoding device of claim 1, wherein the processor is further configured to:
identify a symbol from the bitstream;
decode from the bitstream an occupancy map frame that includes pixels that identify the portion of the pixels in the frame that represent the geometric locations of the vertices of the 3D mesh; and
decode connectivity information using direct decoding based on the geometric locations of the vertices of the 3D mesh.

6. The decoding device of claim 5, wherein to decode the connectivity information using direct decoding, the processor is configured to:
select a first pixel of the frame;
identify subsequent pixels along a predefined pattern around the first pixel based on a determination that (i) a pixel in the frame is identified as occupied based on a value of that pixel in the occupancy map frame and (ii) a pixel in the frame is located in a same overlapped patch as the first pixel;
incrementally traverse the predefined pattern around the first pixel landing at each of the subsequent pixels along the predefined pattern until the symbol is identified at a final pixel; and
generate an edge between the first pixel and the final pixel.

7. The decoding device of claim 6, wherein to incrementally traverse the predefined pattern around the first pixel, the processor is configured to
skip any subsequent pixel that would cause the edge to be created that would cross an existing edge.

8. An encoding device for mesh encoding, the encoding device comprising:
a processor configured to:
identify, for a three dimensional (3D) mesh composed of triangles, normal vectors associated with the triangles of the 3D mesh, respectively, wherein the triangles are associated with vertices and connectivity information,
generate overlapped patches representing one or more of the triangles corresponding to portions of the 3D mesh, wherein the normal vectors of the triangles in an overlapped patch are closest to a projection direction of the overlapped patch,
generate frames that include pixels representing the overlapped patches, and
encode the frames and the connectivity information to generate a bitstream; and
a communication interface operably coupled to the processor, the communication interface configured to transmit the bitstream.

9. The encoding device of claim 8, wherein:
the projection direction is one projection direction of multiple projection directions;
each of the multiple projection directions correspond to different classes; and
to generate a first overlapped patch of the overlapped patches the processor is further configured to:
assign each of the triangles to a class of the different classes,
select a first triangle that is assigned to a first class, include the first triangle in the first overlapped patch,
identify additional triangles that (i) are assigned to the first class and (ii) share at least one vertex with the first triangle or any other triangle that is included in the first overlapped patch, and
include the additional triangles in the first overlapped patch.

10. The encoding device of claim 9, wherein to assign the first triangle to one of the different classes, the processor is further configured to:
compare a direction of the normal vector of the first triangle to the multiple projection directions, wherein the direction of the normal vector is perpendicular to an external surface of the first triangle;
select the projection direction from the multiple projection directions based on a predefined criteria indicating that the direction of the normal vector of the first triangle is closest to the projection direction; and
assign the first triangle to the first class based on a comparison of the direction of the normal vector of the first triangle to each of the multiple projection directions.

11. The encoding device of claim 8, wherein the processor is further configured to:
select a first triangle from the 3D mesh; and
identify a second triangle from the 3D mesh that shares an edge with the first triangle, wherein the shared edge indicates that the first triangle and the second triangle share at least two vertices that are connected by shared edge.

12. The encoding device of claim 8, wherein a projection plane corresponding to the overlapped patch indicates an orientation of the overlapped patch.

13. The encoding device of claim 8, wherein the processor is further configured to generate a planar graph representing the connectivity information corresponding to the overlapped patch, wherein an edge connecting two vertices does not intersect any other edge in the planar graph.

14. The encoding device of claim 13, wherein to generate the bitstream, the processor is configured to:
encode the frames; and
encode the planar graph using direct coding.

15. A method for mesh decoding, the method comprising:
receiving a bitstream;
decoding a frame that includes pixels from the bitstream, wherein a portion of the pixels of the frame represent geometric locations of vertices of a three dimensional (3D) mesh that are organized into overlapped patches;
decoding connectivity information from the bitstream,
identifying triangles associated with the overlapped patches, wherein the triangles represented in an overlapped patch of the overlapped patches are allocated to a projection direction closest to a normal vector associated with each of the triangles of the overlapped patch; and
reconstructing the 3D mesh based on the connectivity information and the overlapped patches.

16. The method of claim 15, wherein:
the overlapped patches include a first overlapped patch and a second overlapped patch; and
the method further comprises:
in response to a determination that the frame was encoded losslessly, identifying a first vertex that is included in the first overlapped patch and a second vertex that is in the second overlapped patch;
determining that the first vertex matches the second vertex; and
removing the first vertex from the first overlapped patch or second vertex from the second overlapped patch while the 3D mesh is reconstructed.

17. The method of claim 15, further comprising:
in response to a determination that the frame was encoded in a lossy manner, identifying a first vertex that is included in a first overlapped patch and a second vertex that is in a second overlapped patch, wherein the first and second vertices are represented by three coordinates and wherein the first overlapped patch is projected in a first projection direction and the second overlapped patch is projected in a second projection direction;
determining that the first vertex matches the second vertex based on the first and second vertices sharing a first coordinate;
modify a second coordinate of the first vertex to match a second coordinate of the second vertex; and
modify a third coordinate of the second vertex to match a third coordinate of the first vertex.

18. The method of claim 15, further comprising determining a traversal direction of a triangle of the overlapped patch based on a projection direction of the overlapped patch.

19. The method of claim 15, further comprising:
identifying a symbol from the bitstream;
decoding from the bitstream an occupancy map frame that includes pixels that identify the portion of the pixels in the frame that represent the geometric locations of the vertices of the 3D mesh; and
decoding connectivity information using direct decoding based on the geometric locations of the vertices of the 3D mesh.

20. The method of claim 19, wherein decoding the connectivity information using direct decoding, comprises:
selecting a first pixel of the frame;
identifying subsequent pixels along a predefined pattern around the first pixel based on a determination that (i) a pixel in the frame is identified as occupied based on a value of that pixel in the occupancy map frame and (ii) a pixel in the frame is located in a same overlapped patch as the first pixel;
incrementally traversing the predefined pattern around the first pixel landing at each of the subsequent pixels along the predefined pattern until the symbol is identified at a final pixel; and
generating an edge between the first pixel and the final pixel.

* * * * *